United States Patent
Hariharan et al.

(10) Patent No.: US 9,112,686 B2
(45) Date of Patent: Aug. 18, 2015

(54) HARQ ACK/NACK FOR DYNAMIC PDSCH

(75) Inventors: Priya Hariharan, Dallas, TX (US); Christian Wengerter, Kleinheubach (DE)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 339 days.

(21) Appl. No.: 13/140,333

(22) PCT Filed: Oct. 8, 2009

(86) PCT No.: PCT/EP2009/007236
§ 371 (c)(1),
(2), (4) Date: Sep. 2, 2011

(87) PCT Pub. No.: WO2010/069422
PCT Pub. Date: Jun. 24, 2010

(65) Prior Publication Data
US 2011/0310856 A1    Dec. 22, 2011

(51) Int. Cl.
*H04L 1/16* (2006.01)
*H04L 1/18* (2006.01)
*H04L 5/14* (2006.01)
*H04L 5/00* (2006.01)

(52) U.S. Cl.
CPC ............ *H04L 1/1607* (2013.01); *H04L 1/1854* (2013.01); *H04L 1/1861* (2013.01); *H04L 5/001* (2013.01); *H04L 5/0055* (2013.01); *H04L 5/0091* (2013.01); *H04L 5/14* (2013.01); *H04L 5/0007* (2013.01)

(58) Field of Classification Search
None
See application file for complete search history.

(56) References Cited

U.S. PATENT DOCUMENTS

| 2007/0104136 A1* | 5/2007 | Pecen et al. .................. 370/329 |
| 2008/0080560 A1* | 4/2008 | Inoue et al. .................. 370/491 |
| 2010/0329128 A1* | 12/2010 | Kuchibhotla et al. ......... 370/252 |
| 2011/0092242 A1* | 4/2011 | Parkvall et al. ............... 455/509 |

OTHER PUBLICATIONS

Ericsson, "Details of ACK/NACK bundling for TDD", May 5 2008, 3gpp TSG-RAN WG1 #53, pp. 1-4.*
Panasonic, "MAC to physical layer mapping and control signaling for carrier aggregation", Nov. 10, 2008, 3gpp TSG-RAN WG1 #55, pp. 1-4.*
International Search Report dated Jan. 20, 2010.
Written Opinion of the International Search Authority dated Jan. 20, 2010.
3GPP TSG-RAN WG1 Meeting #55, "MAC to physical layer mapping and control signaling for center aggregation," Panasonic, R1-084222, Nov. 10-14, 2008, pp. 1-4.

(Continued)

*Primary Examiner* — Jason Mattis
*Assistant Examiner* — Adnan Baig
(74) *Attorney, Agent, or Firm* — Dickinson Wright PLLC

(57) ABSTRACT

The aim of the present invention is to provide an efficient and reliable transmission/reception mechanisms for a communication system with multiple component carriers, each of which further includes physical resources such as transmission slot/symbol, subcarrier/frequency subband, code, or radiation pattern. Accordingly, the control signal of a component carrier comprises a scheduling assignment specifying for said component carrier a resource for transmission of a data signal, and an allocation map specifying that a scheduling assignment has been sent for another component carrier. Signalizing the allocation map enables detection of possibly missed scheduling assignments.

12 Claims, 28 Drawing Sheets

(56) References Cited

OTHER PUBLICATIONS

TSG-RAN WG1 #53, "Details of ACK/NAK bundling for TDD," Ericsson, R1-082002, May 5-9, 2008, pp. 1-6.
TSG-RAN WG1 #53bis, "Remaining issues for TDD ACK/NAK bundling and PUSCH," Ericsson, R1-082462, Jun. 30-Jul. 4, 2008, pp. 1-4.
TSG-RAN WG1 #55, "Solve DTX for bundled ACK/NAK collide with CQI/PMI or SR on PUCCH," ZTE, R1-084107, Nov. 10-14, 2008, pp. 1-6.
3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, pp. 1-77.

* cited by examiner

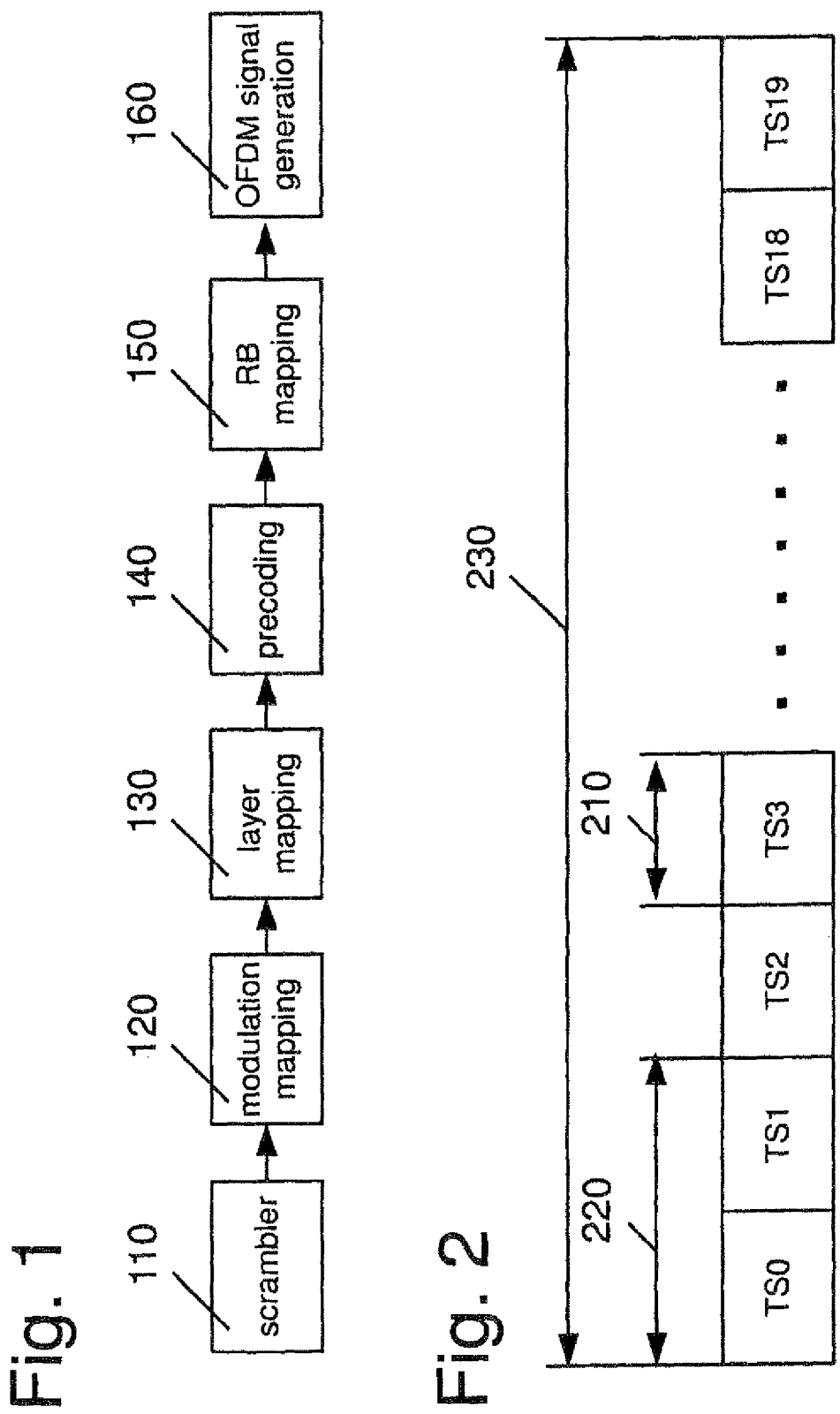

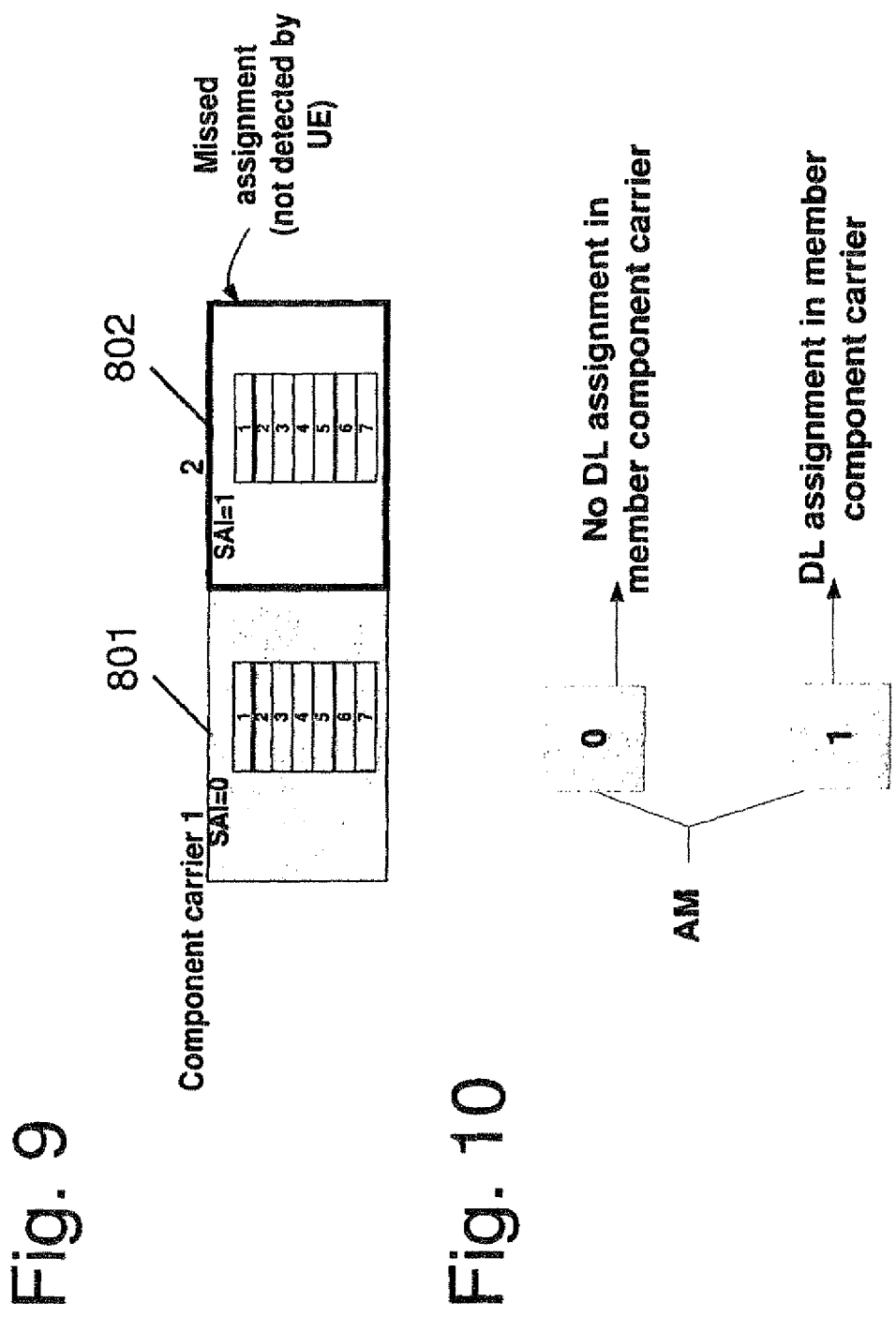

Fig. 18

| Bits (b0,b1,b2) | PDCCH 1 | PDCCH 2 | PDCCH 3 | PDCCH 4 |
|---|---|---|---|---|
| 000 | 1 | 2 | 3 | 4 |
| 001 | 1,2 | 2,1 | 3,1 | 4,1 |
| 010 | 1,3 | 2,3 | 3,2 | 4,2 |
| 011 | 1,4 | 2,4 | 3,4 | 4,3 |
| 100 | 1,2,3 | 1,2,3 | 1,2,3 | 1,2,3 |
| 101 | 1,2,4 | 1,2,4 | 1,2,4 | 1,2,4 |
| 110 | 1,3,4 | 1,3,4 | 1,3,4 | 1,3,4 |
| 111 | 1,2,3,4 | 1,2,3,4 | 1,2,3,4 | 1,2,3,4 |

Signalled in each PDCCH depending on assignments in other component carriers

PDCCH 1, 2, 3, 4 corresponds to reference or member component carriers

The numbers corresponds to the component carrier index which has assignments

HARQ ACK/NACK FOR DYNAMIC PDSCH

The present invention relates to a transmission and reception of a data signal and a control signal in a wireless communication system.

BACKGROUND OF THE INVENTION

Third-Generation (3G) mobile systems, such as for instance Universal Mobile Telecommunications System (UMTS) standardized within the Third-Generation Partnership Project (3GPP), have been based on Wideband Code Division Multiple Access (WCDMA) radio access technology. Today, the 3G systems are being deployed on a broad scale all around the world. A first step in enhancing this technology entails introducing High-Speed Downlink Packet Access (HSDPA) and an enhanced uplink, also referred to as High Speed Uplink Packet Access (HSUPA), both of them providing an improvement of radio access in spectral efficiency and flexibility compared to plain UMTS.

While HSDPA and HSUPA still take the advantage of the WCDMA radio access technology, the next major step or evolution of the UMTS standard has brought a combination of Orthogonal Frequency Division Multiplexing (OFDM) for the downlink and Single Carrier Frequency Division Multiplexing Access (SC-FDMA) for the uplink. The new study item which has become later a work item has been named "Evolved UMTS Terrestrial Radio Access (UTRA) and UMTS terrestrial Radio Access Network (UTRAN)", abbreviated to E-UTRA and E-UTRAN and often referred to as Long-Term Evolution (LTE) since it is intended to cope with future technology evolutions.

The target of LTE is to achieve significantly higher data rates compared to HSDPA and HSUPA, to improve the coverage for the high data rates, to significantly reduce latency in the user plane in order to improve the performance of higher layer protocols (for example, TCP), as well as to reduce delay associated with control plane procedures such as, for instance, session setup. Focus has been given to the convergence towards use of Internet Protocol (IP) as a basis for all future services, and, consequently, on the enhancements to the packet-switched (PS) domain.

A radio access network is, in general, responsible for handling all radio-access related functionality including scheduling of radio channel resources. The core network may be responsible for routing calls and data connections to external networks. In general, today's mobile communication systems (for instance GSM, UMTS, cdma200, IS-95, and their evolved versions) use time and/or frequency and/or codes and/or antenna radiation pattern to define physical resources. These resources can be allocated for a transmission for either a single user or divided to a plurality of users. For instance, the transmission time can be subdivided into time periods usually called time slots then may be assigned to different users or for a transmission of data of a single user. The frequency band of such a mobile systems may be subdivided into multiple sub-bands. The data may be spread using a (quasi) orthogonal spreading code, wherein different data spread by different codes may be transmitted using, for instance, the same frequency and/or time. Another possibility is to use different radiation patterns of the transmitting antenna in order to form beams for transmission of different data on the same frequency, at the same time and/or using the same code.

The architecture defined in LTE is called Evolved Packet System (EPS) and comprises apart from E-UTRAN on the radio access side also the Evolved Packed Core (EPC) on the core network side. LTE is designed to meet the carrier needs for high-speed data and media transport as well as providing high capacity voice support to the next decade.

The LTE network is a two-node architecture consisting of access gateways (aGW) and enhanced base stations, so-called eNode Bs (eNB). The access gateways handle core network functions, i.e. routing calls and data connections to external networks, and also implement radio access network functions. Thus, the access gateway may be considered as combining the functions performed by Gateway GPRS Support Node (GGSN) and Serving GPRS Support Node (SGSN) in today's 3G networks and radio access network functions, such as for example header compression, ciphering/integrity protection. The eNodeBs handle functions such as for example Radio Resource Control (RRC), segmentation/concatenation, scheduling and allocation of resources, multiplexing and physical layer functions. E-UTRAN air (radio) Interface is thus an interface between a User Equipment (UE) and an eNodeB. Here, the user equipment may be, for instance, a mobile terminal, a PDA, a portable PC, a PC, or any other apparatus with receiver/transmitter conform to the LTE standard. The described architecture is exemplified in FIG. 31.

Multi carrier transmission introduced on the E-UTRAN air interface increases the overall transmission bandwidth, without suffering from increased signal corruption due to radio-channel frequency selectivity. The proposed E-UTRAN system uses OFDM for the downlink and SC-FDMA for the uplink and employs MIMO with up to four antennas per station. Instead of transmitting a single wideband signal such as in earlier UMTS releases, multiple narrow-band signals referred to as "subcarriers" are frequency multiplexed and jointly transmitted over the radio link. This enables E-UTRA to be much more flexible and efficient with respect to spectrum utilization.

In 3GPP LTE, the following downlink physical channels are defined (3GPP TS 36.211 "Physical Channels and Modulations", Release 8, v. 8.3.0, May 2008, available at http://www.3gpp.org and incorporated herein by reference):

Physical Downlink Shared Channel (PDSCH)
Physical Downlink Control Channel (PDCCH)
Physical Broadcast Channel (PBCH)
Physical Multicast Channel (PMCH)
Physical Control Format Indicator Channel (PCFICH)
Physical HARQ Indicator Channel (PHICH)
In addition, the following uplink channels are defined:
Physical Uplink Shared Channel (PUSCH)
Physical Uplink Control Channel (PUCCH)
Physical Random Access Channel (PRACH).

The PDSCH and the PUSCH are utilised for data and multimedia transport in downlink (DL) and uplink (UL), respectively, and hence designed for high data rates. The PDSCH is designed for the downlink transport, i.e. from eNode B to at least one UE. In general, this physical channel is separated into discrete physical resource blocks and may be shared by a plurality of UEs. The scheduler in eNodeB is responsible for allocation of the corresponding resources, the allocation information is signalised. The PDCCH conveys the UE specific and common control information for downlink and the PUCCH conveys the UE specific control information for uplink transmission.

LTE standard supports two different radio frame structures, which are applicable to Frequency Division Duplex (FDD) and Time Division Duplex (TDD) modi of the standard.

The general baseband signal processing in LTE downlink is shown in FIG. 1 (cf. 3GPP TS 36.211 "Multiplexing and Channel Coding", Release 8, v. 8.3.0, May 2008, available at http://www.3gpp.org and incorporated herein by reference). First, information bits, which contain the user data or the control data, are block-wise encoded (channel coding by a forward error correction such as turbo coding) resulting in codewords. The blocks of encoded bits (codewords) are then scrambled 110. By applying different scrambling sequences for neighbouring cells in downlink, the interfering signals are randomized, ensuring full utilisation of the processing gain provided by the channel code. The blocks of scrambled bits (codewords), which form symbols of predefined number of bits depending on the modulation scheme employed, are transformed 120 to blocks of complex modulation symbols using the data modulator. The set of modulation schemes supported by LTE downlink includes QPSK, 16-QAM and 64-QAM corresponding to two, four or six bits per modulation symbol Layer mapping 130 and precoding 140 are related to Multiple-Input/Multiple-Output (HMO) applications supporting more receiving and/or transmitting antennas. The complex-valued modulation symbols for each of the codewords to be transmitted are mapped onto one or several layers, LTE supports up to four transmitting antennas. The antenna mapping can be configured in different ways to provide multi antenna schemes including transmit diversity, beam forming, and spatial multiplexing. The set of resulting symbols to be transmitted on each antenna is further mapped 150 on the resources of the radio channel, i.e., into the set of resource blocks assigned for particular UE by a scheduler for transmission. The selection of the set of resource blocks by the scheduler depends on the channel quality indicator (CQI)—a feedback information signalized in the uplink by the UE and reflecting the measured channel quality in the downlink. After mapping of symbols into the set of physical resource blocks, an OFDM signal is generated 160 and transmitted from the antenna ports. The generation of OFDM signal is performed using inverse discrete Fourier transformation (fast Fourier transformation FFT).

The LTE uplink transmission scheme for both FDD and TDD mode is based on SC-FDMA (Single Carrier Frequency Division Multiple Access) with cyclic prefix. A DFT-spread-OFDM method is used to generate an SC-FDMA signal for E-UTRAN, OFT standing for Discrete Fourier Transformation. For DFT-spread-OFDM, a DFT of size M is first applied to a block of M modulation symbols. The E-UTRAN uplink supports, similarly to the downlink QPSK, 16-QAM and 64-QAM modulation schemes. The OFT transforms the modulation symbols into the frequency domain and the result is mapped onto consecutive subcarriers. Subsequently, an inverse FFT is performed is performed as in OFDM downlink, followed by addition of the cyclic prefix. Thus, the main difference between SC-FDMA and OFDMA signal generation is the DFT processing. In an SC-FDMA signal, each subcarrier contains information of all transmitted modulation symbols, since the input data stream has been spread by the OFT transform over the available subcarriers. In OFDMA signal, each subcarrier only carries information related to specific modulation symbols.

FIG. 2 illustrates the time domain structure for LTE transmission applicable to FDD mode. The radio frame 230 has a length of $T_{frame}$=10 ms, corresponding to the length of a radio frame in previous UMTS releases. Each radio frame further consists of ten equally sized subframes 220 of the equal length $T_{subframe}$=1 ms. Each subframe 220 further consists of two equally sized time slots (TS) 210 of length $T_{slot}$=0.5 ms. Up to two codewords can be transmitted in one subframe.

FIG. 3 illustrates the time domain structure for LTE transmission applicable to TDD mode. Each radio frame 330 of length $T_{frame}$=10 ms consists of two half-frames 340 of length 5 ms each. Each half-frame 340 consists of five subframes 320 with length $T_{subframe}$=1 ms and each subframe 320 further consists of two equally sized time slots 310 of length $T_{slot}$=0.5 ms.

Three special fields called DwPTS 350, GP 360, and UpPTS 370 are included in each half-frame 340 in subframe number SF1 and SF6, respectively (assuming numbering of ten subframes within a radio frame from SF0 to SF9). Subframes SF0 and SF5 and special field DwPTS 350 are always reserved for downlink transmission. Seven configurations of supported uplink-downlink subframe allocations within one frame are listed in Table 1, wherein D denotes a subframe dedicated to downlink transmission, U denotes a subframe dedicated to uplink transmission and S denotes a special subframe carrying the special fields DwPTS 350, GP 360, and UpPTS 370.

TABLE 1

LTE Rel'8 uplink-downlink configurations

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The physical resources for the OFDM (DL) and SC-FDMA (UL) transmission are often illustrated in a time-frequency grid wherein each column corresponds to one OFDM or SC-FDMA symbol and each row corresponds to one OFDM or SC-FDMA subcarrier, the numbering of columns thus specifying the position of resources within the time domain, and the numbering of the rows specifying the position of resources within the frequency domain.

The time-frequency grid of $N_{RB}^{UL}N_{sc}^{RB}$ subcarriers and $N_{symb}^{UL}$ SC-FDMA symbols for a time slot ISO 410 in uplink is illustrated in FIG. 4. The quantity $N_{RB}^{UL}$ depends on the uplink transmission bandwidth configured in the cell and shall fulfill $$N_{RB}^{min,UL} \leq N_{RB}^{UL} \leq N_{RB}^{max,UL},$$

where the values and $N_{RB}^{min,UL}$=6 and $N_{RB}^{max,UL}$=110 define the smallest and largest uplink bandwidth, respectively. The number $N_{symb}^{UL}$ of SC-FDMA symbols in a time slot depends on the cyclic prefix length configured by higher layers.

A smallest time-frequency resource corresponding to a single subcarrier of an SC-FDMA symbol is referred to as a resource element 420. A resource element 420 is uniquely defined by the index pair (k,l) in a time slot where k=0, . . . , $N_{RB}^{UL}N_{sc}^{RB}$−1 and l=0, . . . , $N_{symb}^{UL}$−1 are the indices in the frequency and time domain, respectively.

The uplink subcarriers are further grouped into resource blocks (RB) 430. A physical resource block is defined as $N_{symb}^{UL}$ consecutive SC-FDMA symbols in the time domain and $N_{sc}^{RB}$ consecutive subcarriers in the frequency domain. The resource block parameters are shown in Table 2.

TABLE 2

Resource block parameters

| Configuration | $N_{sc}^{RB}$ | $N_{symb}^{UL}$ |
|---|---|---|
| Normal cyclic prefix | 12 | 7 |
| Extended cyclic prefix | 12 | 6 |

The relation between the physical resource block number $n_{PRB}$ in the frequency domain and resource elements (k,l) in a slot is given by $$n_{PRB} = \left\lfloor \frac{k}{N_{sc}^{RB}} \right\rfloor.$$

Each resource block 430 thus consists of twelve consecutive subcarriers and span over the 0.5 ms slot 410 with the specified number of SC-FDMA symbols.

Downlink control signalling is carried by the following three physical channels:
- Physical Control Format Indicator Channel (PCFICH) utilized to indicate the number of OFDM symbols used for control channels in a subframe,
- Physical Hybrid Automatic Repeat Request Indicator Channel (PHICH) utilized to carry downlink acknowledgements (positive: ACK, negative: MACK) associated with uplink data transmission, and
- Physical Downlink Control Channel (PDCCH) which carries downlink scheduling assignments and uplink scheduling grants.

The Physical Downlink Control Channel carries downlink scheduling assignments. Each scheduling grant is defined based on Control Channel Elements (CCE). Each control channel element corresponds to a set of resource elements. In particular, one CCE contains nine Resource Element Groups (REG), wherein an REG corresponds to four Resource Elements (RE). A control region of a subframe with index k consists of a set of a total number $N_{CCE,k}$ of CCEs, numbered from 0 to $N_{CCE,k}-1$. The control region is distributed over time and frequency control resources. Multiple CCEs can be combined to effectively reduce the coding rate of control signal. CCEs are combined in a predetermined manner using a tree structure to achieve various coding rates as shown in FIG. 5. A PDCCH is an aggregation of either one, two, four or eight CCEs.

In LTE, the PDCCH is mapped to the first n OFDM symbols of a subframe, wherein n is more than or equal to 1 and is less than or equal to three. Transmitting PDCCH in the beginning of the subframe has the advantage of early decoding of the corresponding L1/L2 control information included therein.

In a subframe, multiple PDCCHs can be transmitted. A PDCCH has multiple formats, called Downlink Control Information (DCI) formats. A DCI transports downlink or uplink scheduling information, or uplink power control commands. Upon detection of a PDCCH with DCI format intended for a particular UE in a subframe, the UE decodes the corresponding PDSCH in the same subframe. Moreover, the UE receives PDSCH broadcast control transmissions—namely Paging, RACH Response, and BCCH—associated with DCI formats signaled by a PDCCH in the common search spaces. In addition, the UE is semi-statically configured via higher layer signalling to receive PDSCH data transmissions signaled via PDCCH UE specific search spaces, based on one of the following transmission modes: single antenna port (port 0), transmit diversity, open-loop spatial multiplexing, closed-loop spatial multiplexing, multi-user MIMO, closed-loop Rank=1 precoding, single-antenna port (port 5).

The UE monitors a set of PDCCH candidates for control information in every non-DRX subframe. Here, the monitoring refers to attempts to decode each of the PDCCHs in the set according to all monitored DCI formats. The UE is not required to decode control information on a PDCCH if the channel code rate is larger than ¾, where channel-code rate is defined as number of downlink control information bits divided by the number of physical channel bits on the PDCCH.

The control channels monitored by a UE may be configured by higher layer signalling. The number of CCEs, which are available for control channel assignment, depends on several factors such as carrier bandwidth, number of transmit antennas, and number of OFDM symbols used for control and the CCE size.

The set of PDCCH candidates to be monitored are defined in terms of search spaces, where a search space at aggregation level 1, 2, 4, or 8 is defined by a set of PDCCH candidates as shown in Table 3.

TABLE 3

PDCCH candidates monitored by UE

| Type | Search space | | Number of PDCCH candidates | DCI formats |
|---|---|---|---|---|
| | Aggregation level | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The UE monitors one common search space at each of the aggregation levels 4 and 8. Common search space corresponds to certain number of CCEs on candidate aggregation levels 4 and 8 (cf. last two rows in Table 3). All UEs in the cell shall monitor the common search space.

The UE also monitors one UE-specific search space at each of the aggregation levels 1, 2, 4, and 8. As shown in Table 3, the UE makes several decoding attempts per aggregation level within the UE-specific search space. Assuming two payload sizes (DCI) per aggregation level, one for downlink scheduling assignment and one for uplink grant, the number of decoding attempts per payload size and per aggregation level are: 6 decoding attempts on aggregation level 1+6 decoding attempts on aggregation level 2+2 decoding attempts on aggregation level 4+2 decoding attempts on aggregation level 8. Thus, per payload size there are 16 blind decoding attempts and overall 32 blind decoding attempts to detect PDCCH in UE specific search space. Similarly, there are 12 attempts to detect PDCCH in the common search space. Thus, there are 44 overall attempts to detect PDCCH.

The common and UE-specific search spaces may overlap.

The Physical Uplink Control Channel (PUCCH) carries uplink control information. The supported PUCCH formats are shown in the Table 4.

TABLE 4

PUCCH format for LTE Rel'8

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1a and 1b are applicable for transport of ACK/NACK only in PUCCH transmission. Resources used for transmission of PUCCH formats 1, 1a and 1b are identified by a resource index $n_{PUCCH}^{(1)}$ from which an orthogonal sequence index $n_{oc}(n_s)$ and a cyclic shift $\alpha(n_s,l)$ are determined, the orthogonal sequence index and the cyclic shift defining the spreading code used in SC-FDMA. In general, the physical resource used for transmission of ACK/NACK depends on various factors such as uplink bandwidth configuration, bandwidth reserved for PUCCH format 2/2a/2b, number of cyclic shifts used for PUCCH formats 1/1a/1b in a resource block with a mix of formats 1/1a/1b and 2/2a/2b, cell specific cyclic shift value, resource block size in frequency domain expressed as number of subcarriers and resource index $n_{PUCCH}^{(1)}$, for PUCCH formats 1/1a/1b.

in accordance with LTE Rel'8 in the TDD mode, there are two possibilities to transport ACK/NACK feedback information in uplink, supported by higher layer configuration:

Default mode: ACK/NACK bundling using PUCCH format 1a or 1b. Here, bundling refers to transmitting a single ACK/NACK signal for multiple PDSCH transmissions, and ACK/NACK multiplexing using PUCCH format 1b with channel selection.

FIG. 6 illustrates the TDD ACK/NACK bundling. The ACK/NACK bundling is performed per codeword across multiple downlink subframes 601, 602, 603, and 604 associated with a single uplink subframe. Logical "and" operation is applied to all individual (dynamically and semi-persistently scheduled) PDSCH transmission ACK/NACKs referring to a codeword in the downlink subframes 601, 602, 603, and 604. Consequently, an ACK is transmitted if all bundled downlink subframes transmit ACK. A NACK is transmitted if at least one downlink subframe transmits a NACK. The bundled one or two ACK/NACK bits are transmitted using PUCCH format 1a and PUCCH format 1b, respectively as shown in Table 4.

For a downlink transmission on PDSCH in subframe n, the UE transmits ACK/NACK in subframe m=n+k, where k is given for each downlink subframe by Table 5 for each uplink-downlink configuration mode as introduced in Table 1.

TABLE 5 k value for each DL transmission

| Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 6 | — | — | — | 4 | 6 | — |
| 1 | — | — | 7 | 6 | — | — | — | 7 | 6 | — |
| 2 | — | — | 7 | — | — | — | — | 7 | — | — |
| 3 | — | — | 4 | 11 | — | — | — | — | 7 | 6 6 5 5 |
| 4 | — | — | 12 | 11 | — | — | 8 | 7 | 7 6 5 4 | |
| 5 | — | — | 12 | — | — | — | — | — | — | — |
| 6 | 7 | 7 | — | — | — | 7 | 7 | — | — | 5 |

The UE uses a PUCCH resource with resource index $n_{PUCCH}^{(1)}$ for transmission of ACK/NACK in subframe m. The PUCCH resource is linked to the lowest CCE index of the PDCCH of last detected downlink subframe and the corresponding downlink subframe number.

The ACK/NACK bundling is prone to errors caused by missed downlink scheduling assignments. If the UE is not aware (missing) of downlink scheduling assignments in a subframe, the bundled ACK/NACKs might be transmitted incorrectly. In order to overcome this problem, for each set of bundled downlink subframes at least information about the number of the subframes bundled within the set is exchanged between the eNB and UE.

Providing the number of bundled subframes allows detecting of the missing downlink scheduling assignments and thus reduces the unnecessary retransmissions. The information about the downlink scheduling assignments is indicated by Downlink Assignment Index (DAI). The DAI carries within the PDCCH two bits information which enables the UE to detect possibly missed scheduling assignments. In particular, for TDD, the value of DAI denotes the minimum number of dynamic downlink assignment(s) transmitted to the UE within all bundled subframe(s) n. The DAI may be updated from subframe to subframe. Thus, DAI may be seen as a counter of number of previously assigned downlink subframes within the bundling window. The values of DAI are shown in Table 6.

TABLE 7

Value of Downlink Assignment Index

| DAI MSB, LSB | Value of DAI |
|---|---|
| 0, 0 | 1 |
| 0, 1 | 2 |
| 1, 0 | 3 |
| 1, 1 | 4 |

Upon reception of PDCCH, the UE compares the number of received downlink scheduling assignments with the value of DAI in order to detect the previously missed DL assignments.

Within the 3GPP the description of "Further Advancements for E-UTRA (LTE-Advanced)" has been currently under study and can be found in 3GPP TS 36.814 available at http://www.3gpp.org and incorporated herein by reference. This study item covers technology components to be considered for the evolution of E-UTRA, e.g. to fulfill the requirements on IMT-Advanced carrier aggregation, wherein two or more component carriers are aggregated. This should enable LTE-Advanced (also called LTE-A) to support downlink transmission bandwidths larger than 20 MHz. An LTE Rel-8 terminal can receive transmissions on a single component carrier only. An LTE-Advanced terminal with reception capability beyond 20 MHz shall be capable of simultaneously receiving transmissions on multiple component carriers. Here, simultaneously means within the same radio frame. For instance, in the TDD mode of LTE-A, different component carrier may be transmitted/received for different subframes. In the FDD mode, transmission/reception of multiple component carrier shall be possible even within the same subframe.

An efficient and reliable mechanism for transmitting the data signal (e.g. PDCCH) and the control signal (uplink, downlink) are necessary for such a system.

SUMMARY OF THE INVENTION

The aim of the present invention is to provide an efficient and reliable method and apparatus for transmitting and receiving a data signal and a control signal in a wireless communication system with multiple component carriers.

This is achieved by the features of the independent claims.

Advantageous embodiments of the present invention are subject matter of the dependent claims.

It is the particular approach of the present invention to transmit within a component carrier an allocation map specifying the presence of a scheduling assignment within another component carrier.

Signalling the allocation map enables detection of missed scheduling assignments among the plurality of the component carriers for which the allocation map is determined.

According to a first aspect of the present invention, a method is provided for transmitting a data signal and a control signal in a communication system with multiple component carriers. A component carrier comprises physical resources specified by at least one of transmission slot, subband frequency, code and radiation pattern. Accordingly, a scheduling assignment is generated, specifying for a first component carrier a resource for transmission of a data signal. Further, an allocation map is determined, specifying whether for a second component carrier a scheduling assignment has been generated. A control signal comprising the generated scheduling assignment and the allocation map is transmitted within the first component carrier.

According to another aspect of the present invention, a method is provided for receiving a data signal and a control signal in a wireless communication system with multiple component carriers. A component carrier comprises resources specified by at least one of transmission slot, subband frequency, code and radiation pattern. Accordingly, a control signal is received within a first component carrier and within a second component carrier. From the control signal within the first component carrier a scheduling assignment is extracted, specifying for the first component carrier a resource for receiving a data signal and an allocation map is extracted, specifying whether for the second component carrier a scheduling assignment has been generated. Based on the allocation map and on a control signal within the second component carrier it is evaluated whether a scheduling assignment for the second component carrier has been sent and received.

According to yet another aspect of the present invention, a transmitter is provided for transmitting a data signal and a control signal in a wireless communication system with multiple component carriers. A component carrier comprising resources specified by at least one of transmission slot, subband frequency, code and radiation pattern. The transmitter comprises: an allocation unit for generating a scheduling assignment specifying for a first component carrier a resource for transmission of a data signal. The transmitter further comprises a map determining unit for determining an allocation map specifying whether for a second component carrier a scheduling assignment has been generated. A control signal transmitting unit is capable of transmitting a control signal including the generated scheduling assignment and the allocation map within the first component carrier.

According to still another aspect of the present invention, a receiver is provided for receiving a data signal and a control signal in a wireless communication system with multiple component carriers. A component carrier comprising resources specified by at least one of transmission slot, subband frequency, code and radiation pattern. The receiver comprises a control signal receiving unit for receiving a control signal within a first component carrier and within a second component carrier. The receiver further comprises an extraction unit for extracting from the control signal within the first component carrier a scheduling assignment and an allocation map. The scheduling assignment specifies for the first component carrier a resource for receiving a data signal. The allocation map specifies whether for the second component carrier a scheduling assignment has been generated. An evaluation unit is capable of evaluating, based on the allocation map and on a control signal within the second component carrier, whether a scheduling assignment for the second component carrier has been sent and received.

The terms "a first component carrier" and "a second component carrier" here refer each to an arbitrary of the component carriers of the system, regardless their ordering in the frequency domain.

Preferably, within a resource for transmission of an acknowledgement signal linked with the resource for transmission of the data signal specified for the first component carrier, an acknowledgement signal is to be received/transmitted. The acknowledgement signal is related to the transmitted data signal and is common for data signals in a plurality of component carriers.

In particular, the acknowledgement signal has a binary form consisting of one or more bits signalizing, for instance, a positive acknowledgement or a negative acknowledgement. The common acknowledgement signal is determined preferably by applying logical AND operation to binary acknowledgement signals related to data signals on the plurality of component carriers. Such common acknowledgement signal indicates a positive acknowledgement only if all the summed acknowledgements were positive. Otherwise, a negative common acknowledgement is indicated. Sending a common acknowledgement for a plurality of component carriers has an advantage of a resource requirement reduction. However, the common acknowledgement may also be obtained in another ways, for instance, using another operations such as logical operation OR or signalling the number of negative or positive individual acknowledgements within the bundled component carriers. Moreover, the common acknowledgement may also be a collective acknowledgement report comprising the individual acknowledgement reports, for instance, in a form of a bitmap.

In accordance with an embodiment of the present invention, a control signal within the second component carrier comprises a relative index linked to the resource for scheduling assignment within the first component carrier. In particular, the scheduling assignment within the first component carrier is further related to the acknowledgement signal resource. Thus, the relative index is also linked to the acknowledgement signal resource. This has an advantage of improving the reliability of acknowledgement signal reporting, since even if the first component carrier control signal is not received, the relative index within the second component carrier links to the correct acknowledgement signal resource linked to the first component carrier. The acknowledgement signal may, but does not necessarily have to be transmitted within the same component carrier as the data signal and the control signal.

Preferably, each of the plurality of component carriers comprises at least one of the allocation map and the relative index. Various alternatives are possible, each having its advantages.

In accordance with an embodiment of the present invention, a reference component carrier carries the allocation map specifying for at least one member component the presence of a scheduling assignment. The member carrier(s) do not comprise the allocation map, but comprise the relative index. According to this alternative, a single acknowledgement resource may be used for a bundled acknowledgement signal for the reference component carrier and the member component carrier(s). The missing scheduling assignments between a member and a reference component carrier can be detected.

In accordance with another embodiment of the present invention, each of the carriers comprises an allocation map. Preferably, a reference component carrier also comprises a relative index. This allows for detection of missing scheduling assignments among all component carriers if the allocation table, if the allocation table of each component carrier comprises information related to all other component carriers. However, each of the component carriers may also contain both allocation map and the relative index.

Preferably, an allocation map is represented by a bitmap specifying in a component carrier whether other component carrier(s) comprise or not a scheduling assignment. For each carrier a single bit is necessary to signal such absence or presence of the scheduling assignment. However, the allocation map may have a different form. In particular, the allocation map contains a value (which can be signalized in binary format) specifying which subset of bundled component carriers includes a scheduling assignment. The mapping between different subsets and the value to be signalled may be defined, for instance, in a lookup table. The allocation map may in general have any other format.

Preferably, the acknowledgement signals of different component carriers are bundled and sent within a single physical resource. The bundling may be performed fully or partially. In particular, if M component carriers are configured for the transmission, the bundling may be performed partially, i.e. for subsets of the M component carries. The subsets may, but does not need to overlap. Here, a reference component carrier may be defined for each subset. However, a single reference carrier may also be defined for all M component carriers.

Preferably, the communication system is an LTE-Advanced based system with multiple component carriers.

According to another embodiment of the present invention, the communication system employs MIMO SDM, resulting in a plurality of codewords. The bundling in such a case is preferably performed component carriers of the same codeword. However, the bundling may also be performed for the same component carrier and different codewords, or in any other mixed way.

The present invention is applicable to both modi of the communication system—frequency and time division duplex. In time division duplex mode, the present invention is preferably applied to detect the missing scheduling assignments of component carriers within each subframe, or between a plurality of subframes.

In accordance with yet another aspect of the present invention, a computer program product is provided which comprises a computer readable medium having a computer readable program code embodied thereon, the program code being adapted to carry out any embodiment of the present invention.

The above and other objects and features of the present invention will become more apparent from the following description and preferred embodiments given in conjunction with the accompanying drawings, in which:

FIG. 1 is a block diagram illustrating downlink baseband processing in LTE system;

FIG. 2 is an illustration of radio frame structure for LTE FDD system;

FIG. 9 is an example illustrating the reliability problems of bundles ACK/NACK similar to LTE TDD Rel 8, applied to a communication system with multiple component carriers.

FIG. 10 is a schematic illustration of an allocation map (AM) in accordance with the present invention;

FIG. 18 is a schematic drawing illustrating an example of an allocation map for four linked component carriers;

DETAILED DESCRIPTION

The present invention relates to transmitting and receiving of a data signal and a control signal in a wireless communication system with multiple component carriers. In particular, the present invention provides a reliable and efficient way of transmitting/receiving control signals associated with data signals, such as scheduling/allocation information and/or feedback information.

The present invention may be advantageously used for example in connection with a mobile communication system such as the LTE-Advanced (LTE-A) communication system previously described. However, the use of the present invention is not limited to this particular exemplary communication network. It may be advantageous for transmitting and/or receiving of data signal and control signal over any standardized mobile communication system with multiple component carriers, any evolved versions of such a standardized mobile communication, any future mobile communication systems to be standardized or any proprietary mobile communication system.

Figure 3:
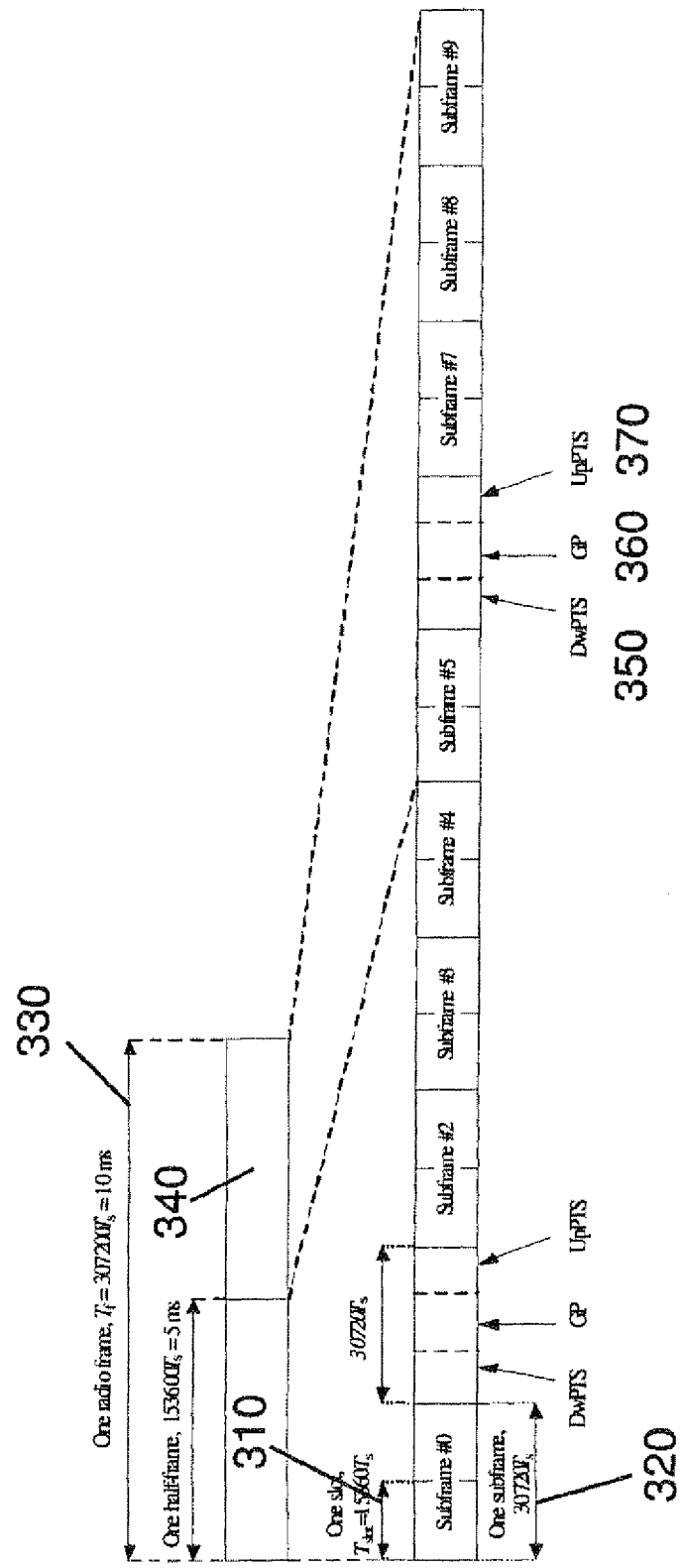
FIG. 3 is an illustration of radio frame structure for LTE TDD system.
Figure 4:
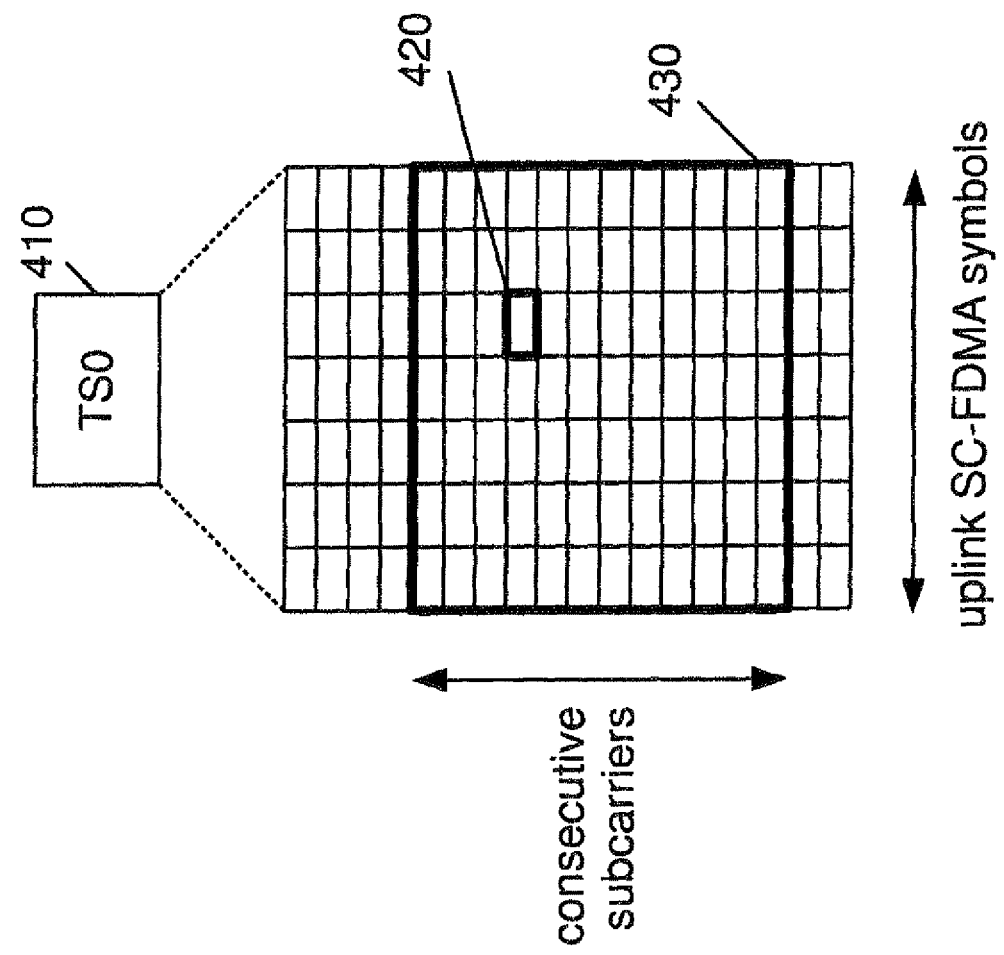
FIG. 4 is an illustration of physical resources in a time-frequency grid for uplink LTE.
Figure 5:
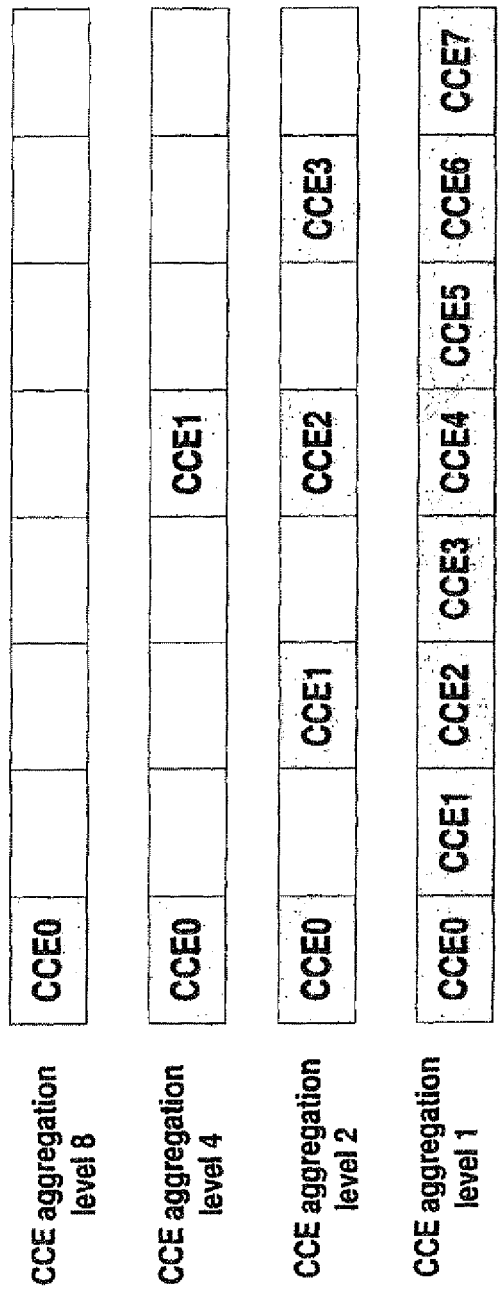
FIG. 5 is an example of a CCE tree structure for LTE.
Figure 6:
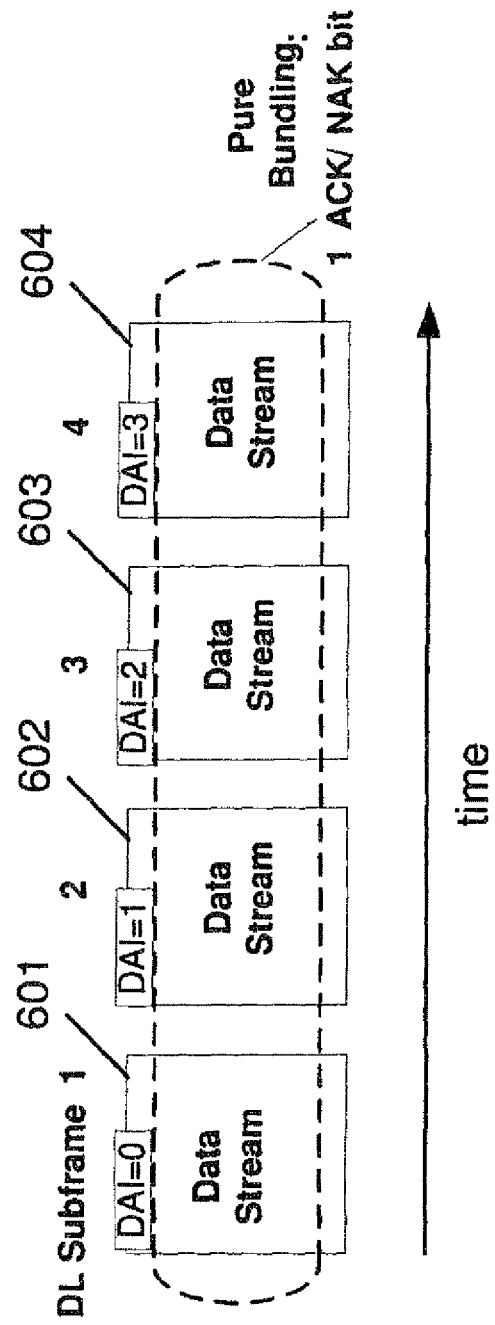
FIG. 6 is a schematic illustration of ACK/NACK bundling in LTE TDD Release 8.
Figure 7:
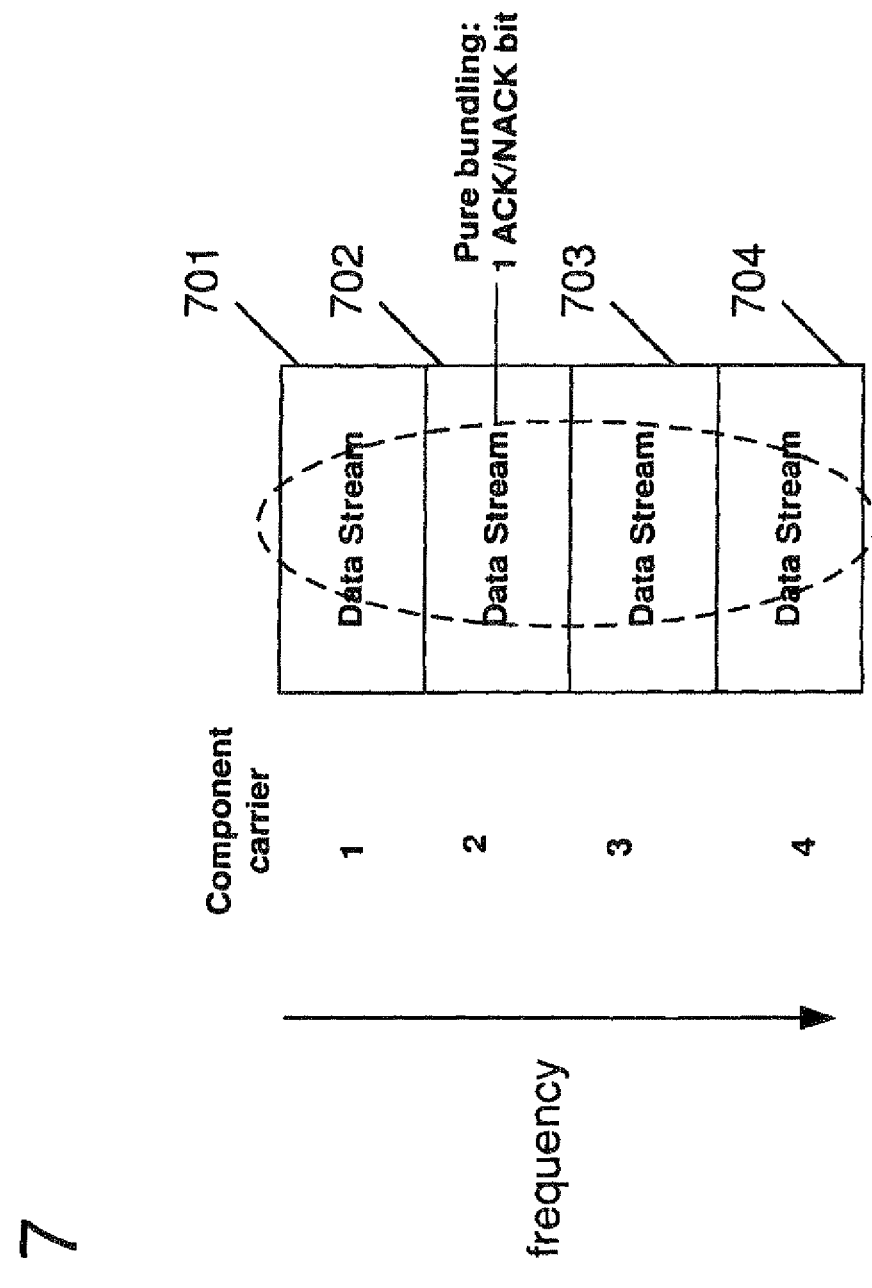
FIG. 7 is a schematic illustration of ACK/NACK bundling in a communication system with multiple component carriers.

Uplink feedback signalling such as ACK/NACK control signalling in a communication system with multiple component carriers may be designed similarly to LTE TDD as described above. In particular, bundling of ACK/NACK may be performed for a plurality of component carriers similarly to bundling of ACK/NACK for a plurality of subframes as shown in FIG. 6. FIG. 7 illustrates an example of such an ACK/NACK bundling for a plurality of component carriers 701, 702, 703, and 704. Adopting of LTE TDD principles has the advantage of applicability to both symmetric and asymmetric bandwidth distribution, i.e. component carrier aggregation, between uplink and downlink. In particular, in LTE-A with component carrier aggregation, the ACK/NACK bundling may improve the PUCCH coverage and capacity. Accordingly, a single uplink component carrier carries a single ACK/NACK for multiple downlink component carriers.

Figure 8:
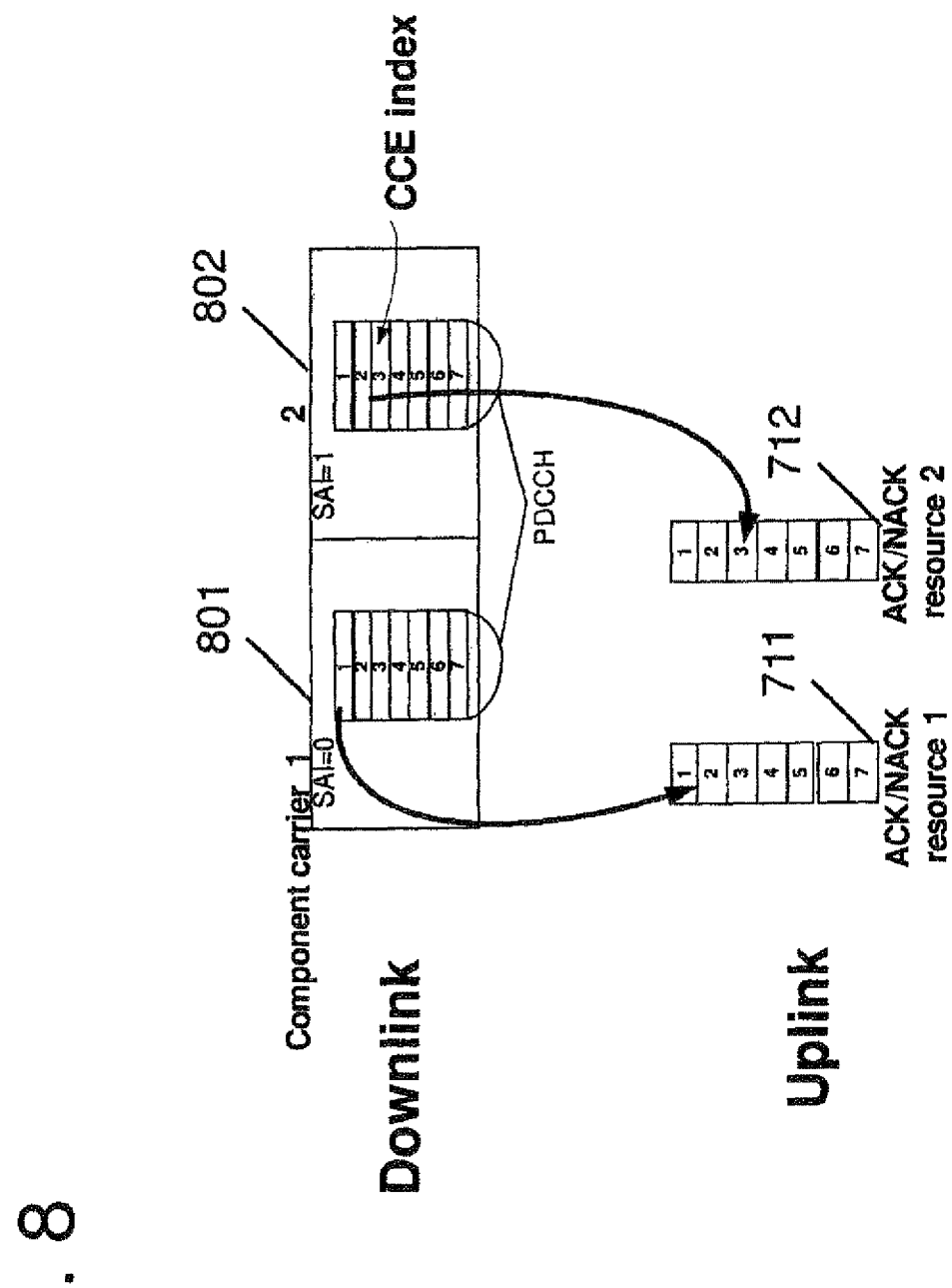
FIG. 8 is a schematic illustration of ACK/NACK bundling similar to LTE TDD Rel 8, applied to a communication system with multiple component carriers.

To further improve the reliability and efficiency of the ACK/NACK bundling for multiple component carriers, a Scheduling Assignment index (SAI), similar to DAI information in PDCCH of the LTE Rel 8, may be used to detect the missed scheduling assignments for a UE. Similar to DAI, SAI is used as a counter to indicate the number of assignments in previous component carriers. FIG. 8 illustrates such an example for two component carriers 801 and 802. In the first component carrier 801, the SAI has a value of zero. A PDCCH within the first component carrier 801 carries a scheduling assignment on CCE with index value 1. A PDCCH within the second component carrier 802 carries a scheduling assignment on CCE with index value 3. The value of SAI in the second component carrier 802 is 1, referring to the scheduling assignment sent within the first component carrier 801. The ACK/NACK resource 711, 712 is linked to the lowest CCE index of PDCCH assigned in one of the component carriers. The mapping between the CCE index and the ACK/NACK index is performed per component carrier. The bundled ACK/NACK in uplink is transmitted using a single ACK/NACK resource corresponding to a predefined (for instance, the last) component carrier.

In FIG. 9 the case is illustrated, in which the SAI cannot detect the missed assignments in the second component carrier 802. An eNB has scheduled a scheduling assignment in two component carriers 801 and 802. Correspondingly, SAI of value 0 and 1 are sent within the control signal for the first 801 and the second 802 component carrier, respectively. In uplink, ACK/NACK resources corresponding to the two component carriers are reserved. The situation when UE misses the PDCCH scheduling assignment in component carrier 802, is analysed in the following from both UE perspective and eNB perspective.

The UE, after receiving the scheduling assignment in component carrier 801 and missing the scheduling assignment in component carrier 802, does not take into account the second component carrier 802 when bundling ACK/NACK report. This is because the UE cannot detect the SAI information in the second component carrier 802, since the UE has missed the PDCCH. If PDSCH transmission on component carrier 801 were successful, the UE would thus send a positive acknowledgement (ACK) as the acknowledgement signal. However, since the PDSCH transmission on component carrier 802 has not been received, the correct common acknowledgement signal for both component carriers 801 and 802 would be a negative acknowledgement (NACK). Consequently, even with SAI signalized, missing the PDCCH in the second component carrier results in an "NACK to ACK" error and thus, to decreased reliability of ACK/NACK reporting from UE to eNB. The consequence of such a UE behaviour would further cause a higher layer (radio link control layer) retransmission of the packet scheduled on component carrier 802, which results in consuming more time and radio resources.

The eNB is capable, based on the resource on which the ACK/NACK is received, of detecting that the ACK/NACK report from UE is unreliable. Such eNB has to reserve ACK/NACK resources proportional to number of component carriers, while only a single ACK/NACK resource is used by the UE. The consequence is increased ACK/NACK resources reserved by eNB for each UE. Upon detecting an unreliable acknowledgement signal, the eNB has to blindly detect the component carriers that are bundled in the ACK/NACK report.

If an eNB assigns a single ACK/NACK resource to the UE for the plurality of linked component carriers, then the eNB has to assign same CCE index in all component carriers. By this way, the CCE index in all component carries points to single ACK/NACK resource. This leads to severe scheduler restriction to the eNB. In this scenario, the eNB might not be capable of blindly detecting the component carriers bundled by the ACK/NACK report.

Thus, even if SAI is transmitted, the unreliable ACK/NACK reporting cannot be avoided. The consequences of unreliable ACK/NACK reporting are higher requirements on resources and higher transmission delay due to the higher layer retransmission of data signal, and increased power consumption and processing delay in case of blind decoding.

The present invention is based on an observation that only a number (counter) of scheduling assignments does not always help to identify the missed scheduling assignment in a component carrier as has been shown above using the example wherein the principle of LTE TDD bundling of ACK/NACK has been applied to a system such as LTE-A with multiple component carriers.

In order to increase the reliability and efficiency of the transmission of control signals related to data signals in a wireless communication system, in accordance with the present invention, an allocation map (AM) is provided within a control signal, the allocation map indicating for a particular component carrier whether a scheduling assignment has been included.

FIG. 10 schematically illustrates an example of such an allocation map, wherein a zero for a component carrier specifies that no scheduling assignment has been included in that component carrier and one for a component carrier specifies that a scheduling assignment has been included in that component carrier. The allocation map may be included within the control signal of a component carrier and may comprise information about the presence of scheduling assignment related to a single or a plurality of other component carriers.

Figure 11:
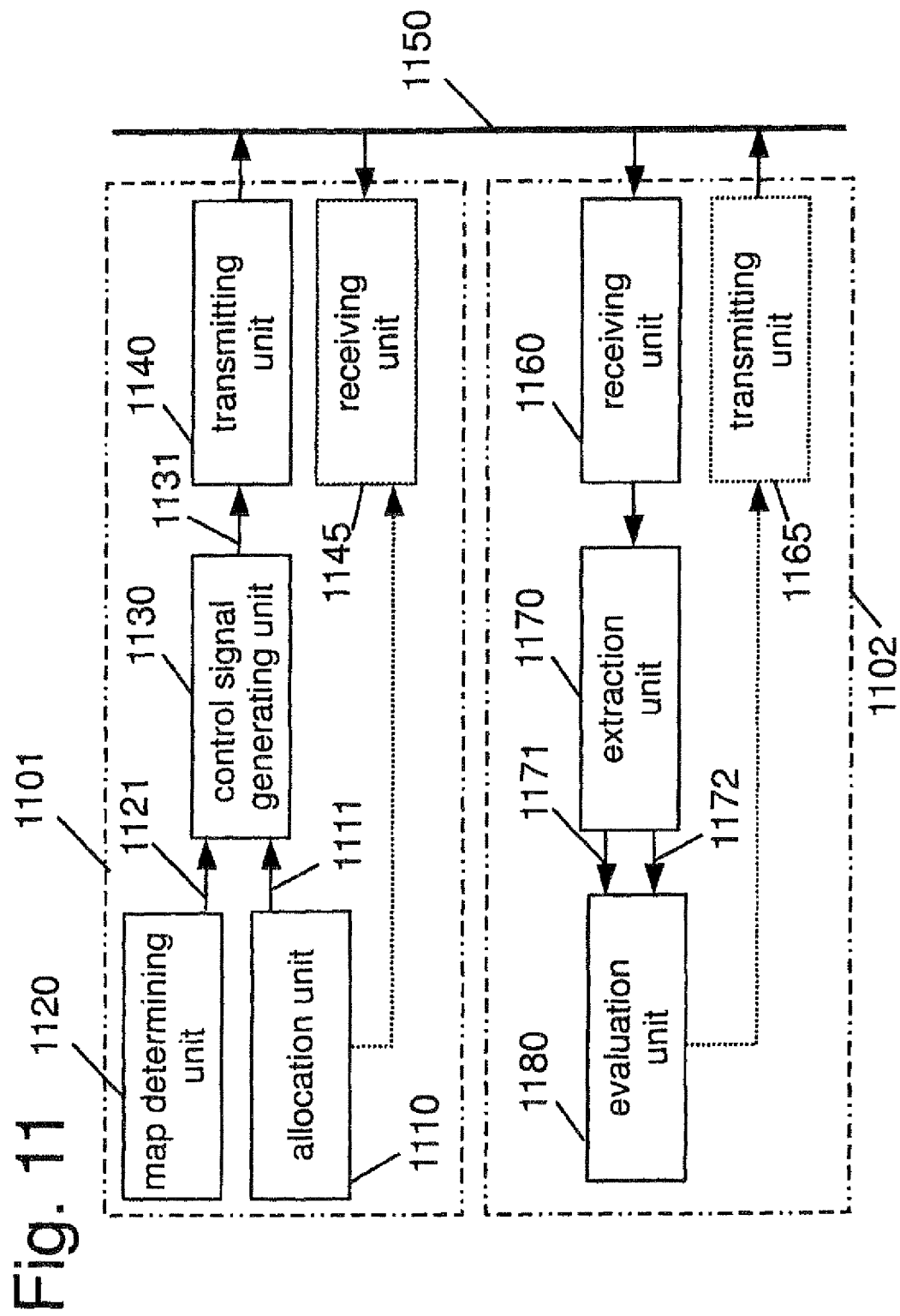
FIG. 11 is a block diagram illustrating a transmitting and a receiving apparatus in accordance with the present invention.

FIG. 11 is a block diagram of a transmitting and receiving apparatus for transmitting/receiving of data signal and control signal in a wireless communication system with multiple component carriers in accordance with the present invention. Accordingly, the transmitter 1101 comprises a control signal transmitting unit 1140, which transmits a control signal 1131 on a channel 1150. The control signal transmitting unit may comprise various multiplexing, modulation, coding and pulse shaping functions necessary for sending the control signal over the wireless communication system. The channel 1150 is a channel defined by the resources of the wireless communication system such as a component carrier, for a component carrier at least one of the time slot/symbol, subcarrier, spreading and/or scrambling code, radiation pattern of an antenna. The generated 1130 control signal 1131 comprises a scheduling assignment 1111 and an allocation map 1121. The scheduling assignment 1111 is generated by an allocation unit 1110 and specifies for a component carrier the resource to be used for transmission of a data signal. The allocation map 1121 is determined by a map generating unit 1120 and specifies whether another component carrier carries a scheduling assignment.

The receiver 1102 includes a control signal receiving unit 1160 for receiving the control signal from the channel 1150. The extraction unit 1170 extracts from the control signal the scheduling assignment 1171 and the allocation map 1172. The scheduling assignment 1171 and the allocation map 1172 are used to evaluate whether a scheduling assignment for the other component carrier has been sent and received. The scheduling assignment for the other component carrier indicates that the scheduling assignment has been received. The allocation map in the first component carrier indicates whether the scheduling assignment in the second component carrier has been sent.

Accordingly, if the scheduling assignment is missing in a component carrier, but the allocation map signalizes for that carrier that an allocation has been specified, the missing scheduling information can be detected. Thus, the reliability of missing scheduling assignment detection is increased. In particular, the transmitter may be a NodeB such as eNB and the receiver may correspond to a UE, both in a wireless communication system based on LTE(-A).

The transmitter 1101 further comprises a data signal transmitting unit 1140 for transmitting the data signal within a resource specified by the scheduling assignment 1111. Preferably, the transmitter also comprises a feedback receiving unit 1145 for receiving an acknowledgement signal. The acknowledge signal (ACK/NACK) is received within a resource for transmission of an acknowledgement signal linked with the resource for transmission of the data signal specified for the first component carrier within the scheduling assignment 1111. In particular, the acknowledgement signal is bundled for more than one component carrier.

Correspondingly, the receiver 1102 further comprises a data signal receiving unit 1160 for receiving the data signal within a resource specified by the scheduling assignment 1171. Preferably, the receiver 1102 further comprises a feedback transmitting unit 1165 for transmitting the acknowledgement signal. The acknowledgement signal (a positive or a negative acknowledgement) is sent in accordance with the correctness of the received data and/or with the result of evaluation performed by the evaluation unit 1180.

In accordance with an embodiment of the present invention, two types of component carriers from the aggregated component carriers are defined:

A reference component carrier to which an ACK/NACK resource (resource for transmitting an acknowledgement signal) is linked to. For instance, a CCE index of the reference component carrier is linked to an ACK/NACK resource index, A member component carrier.

Figure 12:
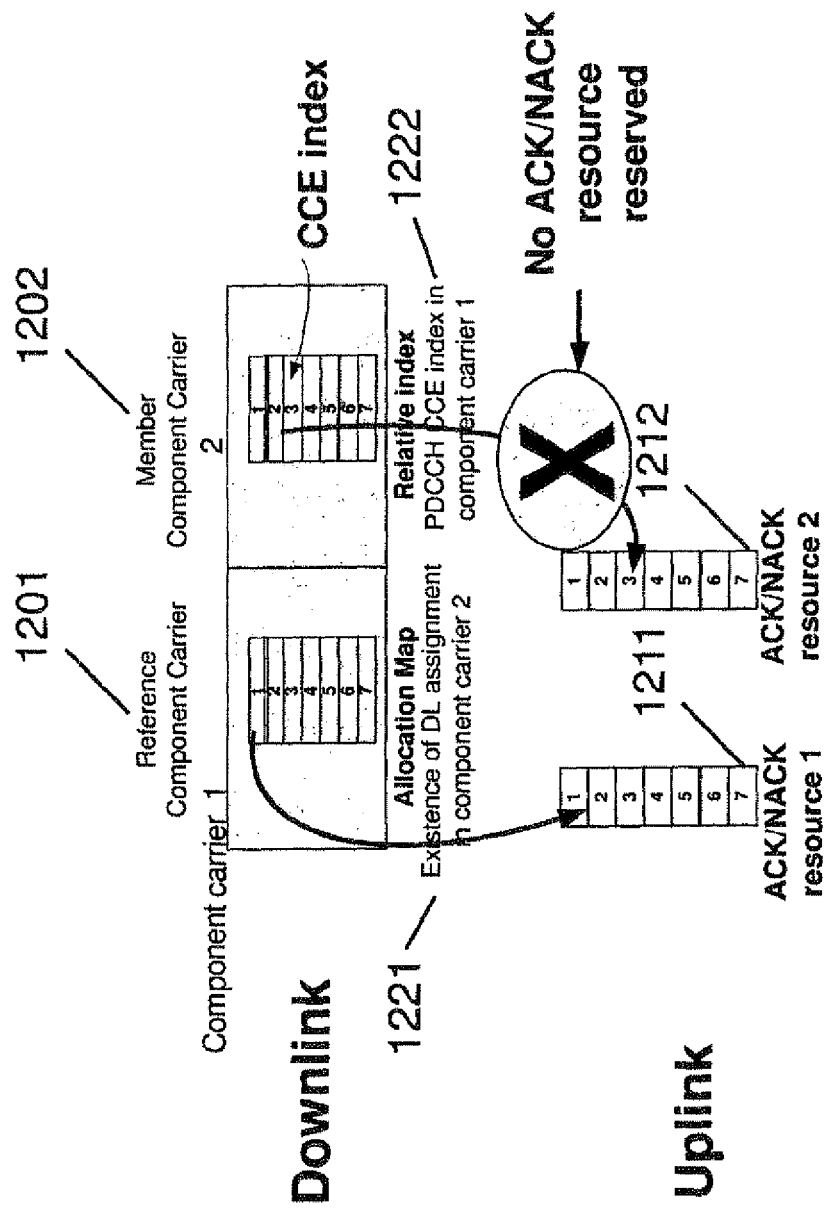
FIG. 12 is a schematic drawing illustrating the transmission and reception of a control signal in accordance with an embodiment of the present invention.

FIG. 12 illustrates an example of a system such as LTE-A, wherein for each UE the PDCCH on a reference component carrier 1201 signals an allocation map 1221. The allocation map 1221 provides information about a member component carrier 1202—whether the member component carrier contains a scheduling assignment. The allocation map 1221 within the reference component carrier 1201 enables the UE to detect the missed scheduling assignments in the member component carrier(s) 1202. In particular, the allocation map may be a bitmap indicating which member component carriers are carrying scheduling assignment. The PDCCH of the reference component carrier comprises a plurality off CCEs, the CCE with index 1 being linked to a particular ACK/NACK resource 1211 in uplink. The mapping between the CCE index and the ACK/NACK resource index has to be defined and may be given by an arbitrary permutation. The ACK/NACK resource is in this embodiment always linked to the PDCCH of the reference component carriers only.

In order to enable the UE also to detect the missed scheduling assignments in the reference component carrier 1221, the PDCCH on the member component carrier 1202 signals information 1222 linking to the reference carrier PDCCH, which links to the ACK/NACK resource 1211. Such information 1222 is, for instance, a Relative index (RI) of the CCE within the PDCCH of the reference component carrier 1201.

In general, more than one member component carrier 1202 may be in this way associated with a single reference component carrier. The reference component carrier comprises the allocation map referencing each of the member component carriers while each member component carrier comprises a relative index referencing PDCCH in the reference carrier. The relative index allows thus for linking to the single ACK/NACK resource associated with the reference component carrier and supports thus the ACK/NACK bundling for the reference component carrier and the member component carrier(s). If the UE decodes at least one PDCCH (out of PDCCHs transmitted within the reference and the member component carriers) correctly, detection of missed scheduling assignments in other component carriers becomes more reliable. Moreover, in this embodiment, the ACK/NACK resource is linked to a single (reference) component carrier, resulting in reduction of the number of reserved ACK/NACK resources per UE.

Figure 13:
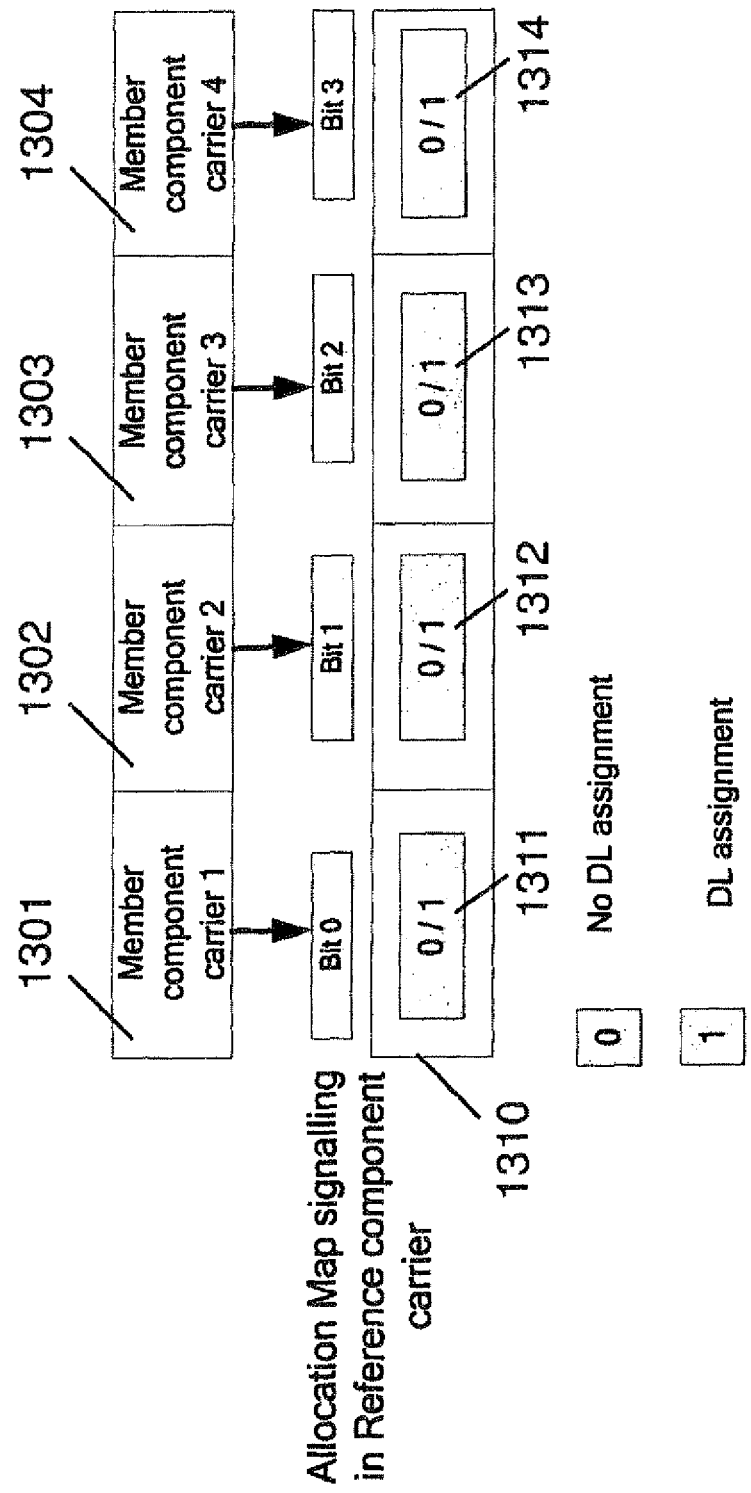
FIG. 13 is a schematic drawing illustrating an example of an allocation map in accordance with the present invention.

In case of more than one member component carriers, the allocation map transmitted within the PDCCH of the reference component carrier may correspond to a bit map with a bit per (member) component carrier indicating the presence of the scheduling assignment as illustrated in FIG. 13. In FIG. 13, the allocation map 1310 comprises 4 bits (numbered from bit 0 to bit 3), each of the four bits indicating presence of a scheduling assignment by value of one and its absence by value of zero. Each of the four bits is associated with one of four respective member component carriers 1301, 1302, 1303 and 1304. Thus, in this embodiment, the size of the allocation map field in the PDCCH of the reference component carrier is N bits, where N is the number of member component carriers.

Figure 14:
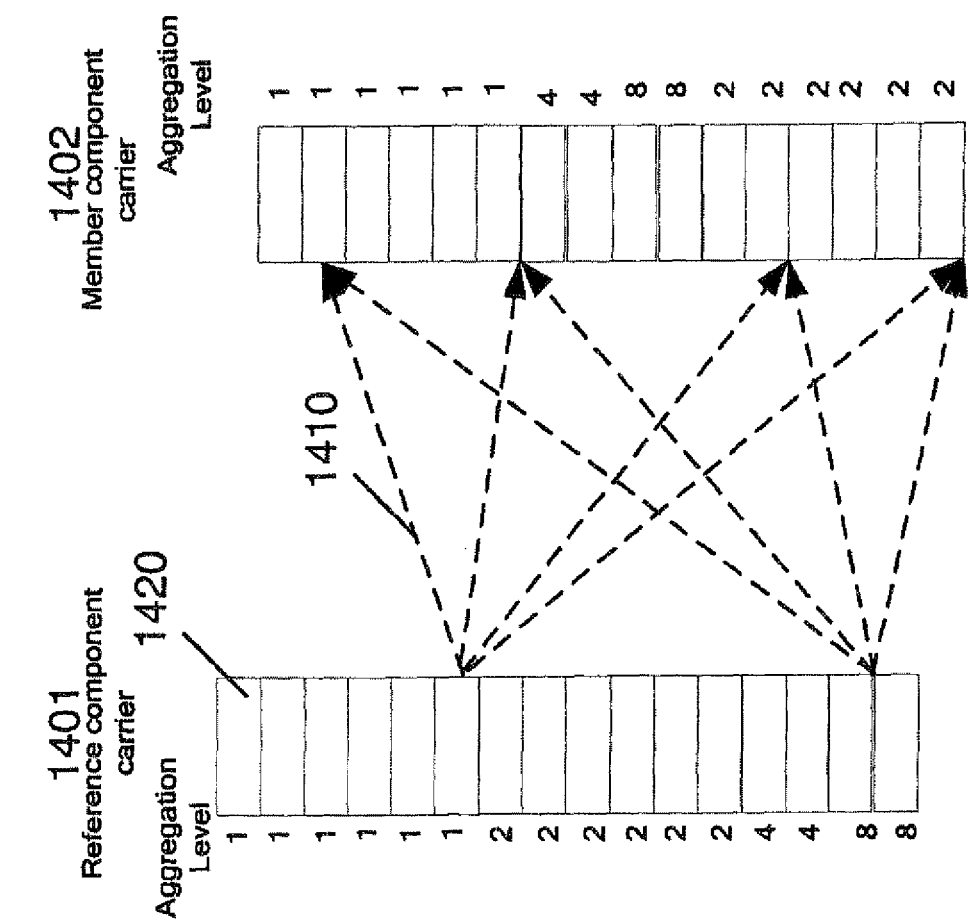
FIG. 14 is a schematic drawing illustrating an example relation between the aggregation levels and CCE indexes of a reference component carrier and a member component carrier in accordance with an embodiment of the present invention.

At least in one member component carrier received by the UE, the relative index is signalled on the PDCCH. For each CCE aggregation level (1, 2, 4, 8) and CCE index 1420 in a reference component carrier 1401, there is a set of possible CCE aggregation levels and CCE indexes in the member component carrier(s) 1402 as shown in FIG. 14. The examples of such possible CCE aggregation levels and CCE indexes in the member component carrier are illustrated by arrows 1410.

Figure 15:
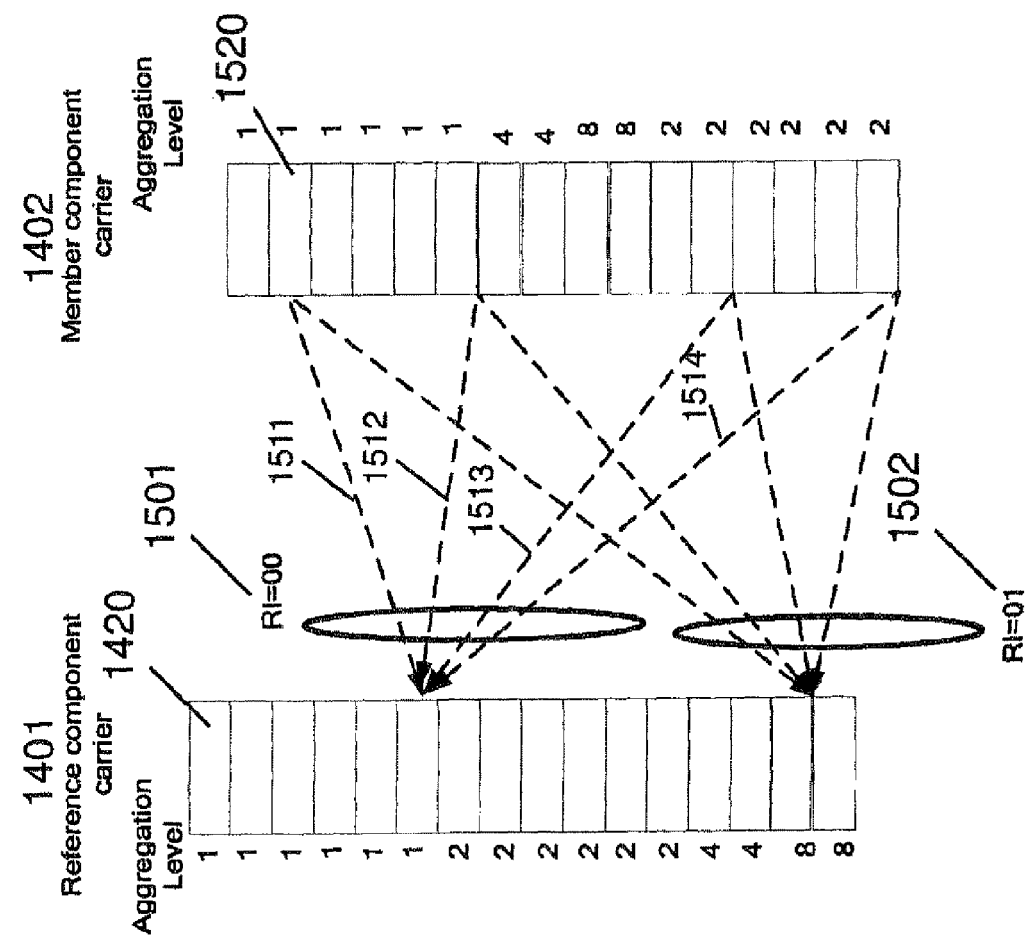
FIG. 15 is a schematic drawing illustrating an example of the signalling of a relative index on a member component carrier.

Relative index (RI) 1501, 1502 can be an index value, which associates a CCE in the member component carrier 1402 to the CCE aggregation level and index 1420 in the reference component carrier 1401 as shown in FIG. 15. Arrows 1511, 1512, 1513 and 1514 indicate the association of four different CCEs (aggregation level, index) in the member component carrier 1402 with the same relative index 1501 having value of "00". Upon detection of the PDCCH in a member component carrier by a UE, the RI information in the PDCCH enables the UE to detect the CCE index in the reference component carrier. In the example in FIG. 15, the PDCCH scheduling assignment 1502 on member component carrier is on CCE aggregation level 1 and CCE index 2. (The CCE index is not explicitly shown in FIG. 15. It is assumed that the values of index within the same aggregation level are starting with 1 on the top and incrementing by one in the bottom direction.) When the UE decodes the PDCCH in the member component carrier 1402, the RI field 1501 points 1511 to the CCE in the reference component carrier 1401. The RI signalling enables a UE to detect the missed assignments in the reference component carrier and to determine the ACK/NACK resource linked with the reference component carrier, which leads to reduction of ACK/NACK resources reserved for the UE.

Figure 16:
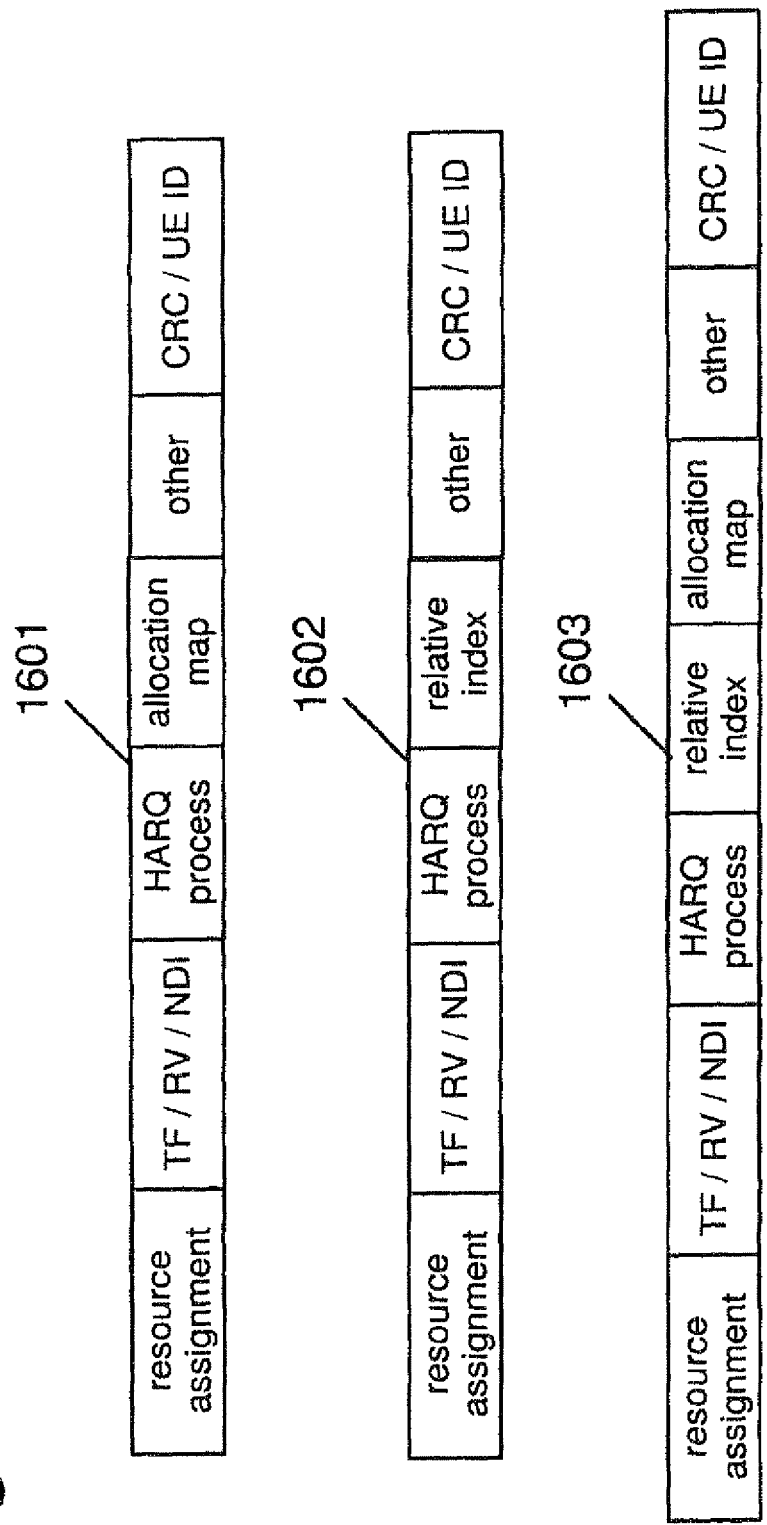
FIG. 16 is a schematic drawing illustrating possible formats of a control channel for transmitting the allocation map and/or relative index.

FIG. 16 illustrates three examples 1601, 1602, and 1603 of a format that can be used for the transmission of the control signal in accordance with the present invention. The allocation map and/or the relative index may be transmitted within the control signal together with other layer1/layer2 control data such as resource assignment (scheduling assignment), transport format (TF), redundancy version (RV), new data indicator (NDI), HARQ process identification, CRC or UE identification.

Figure 17:
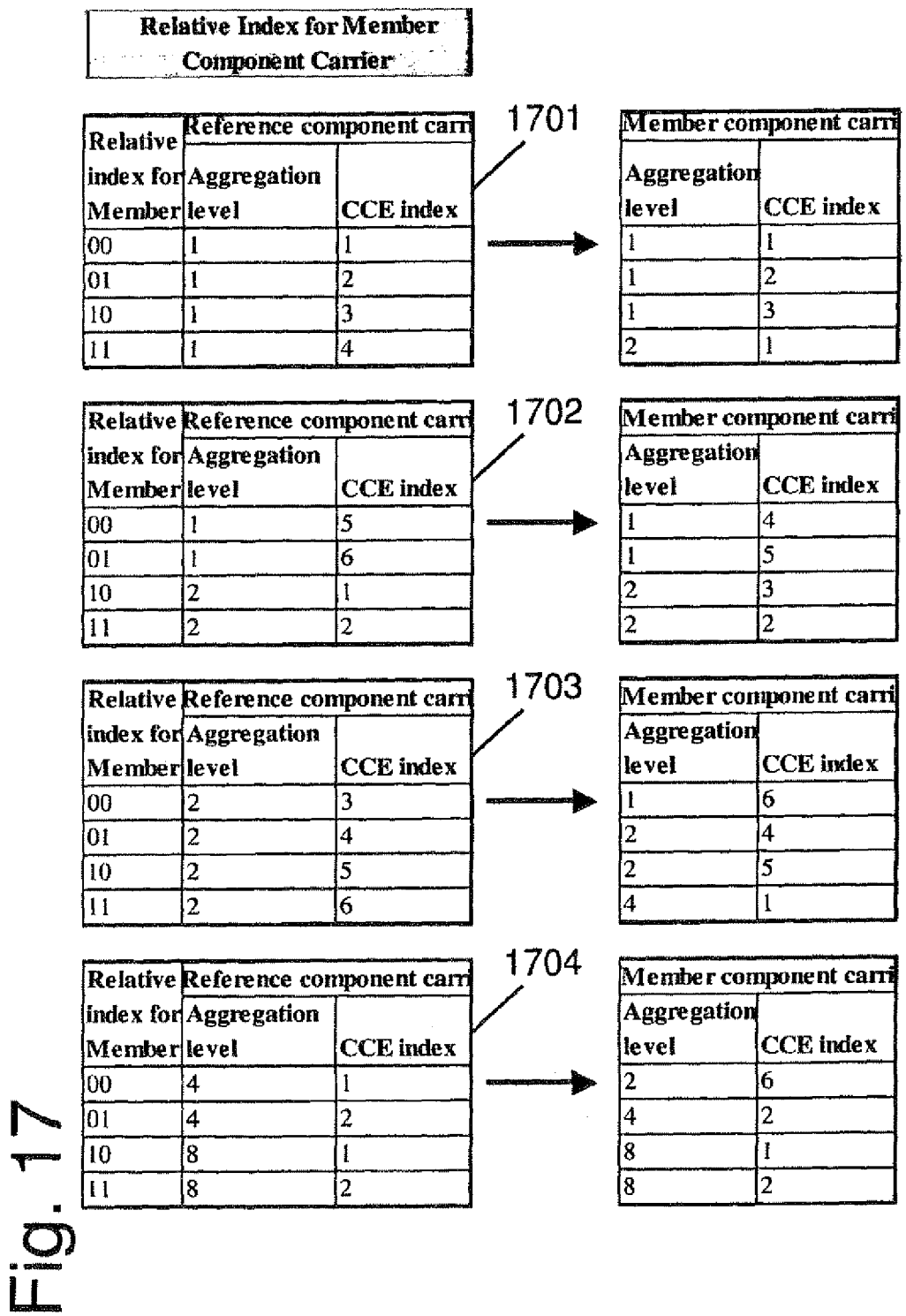
FIG. 17 is a set of tables representing examples of possible configurations of CCE aggregation levels and CCE indexes on reference and member component carriers.

The possible combination of CCE aggregation levels and indexes on the member component carriers and reference component carriers are preferably restricted as shown in FIG. 17. FIG. 17 illustrates four example tables 1701, 1702, 1703 and 1704 with such possible configurations.

Table 8 represents an example scheduling scenario for two component carriers (one reference and one member component carrier), for a one codeword case.

TABLE 8

Illustration of an example eNB Scheduling

|  | Reference component carrier | Member component carrier |
| --- | --- | --- |
| Aggregation level | 1 | 2 |
| CCE index within aggregation level | 1 | 1 |

Assume for this example that the relative index table 1701 shown in FIG. 17 is valid, that the value of allocation map on the reference component carrier for the member component carrier is one, which indicates presence of a scheduling assignment in said member component carrier, and that relative index with value "00" is configured on the member component carrier.

A UE performs the following steps upon decoding of the PDCCH on the reference component carrier at first. The UE identifies the CCE aggregation level as 1 and the CCE index as 1 in accordance with the first column of Table 8. Based on the knowledge of the CCE aggregation level and index, the UE is capable of determining the corresponding ACK/NACK resource using a predefined mapping. Then, the UE detects the allocation map value 1 for the member carrier, indicating that there is a scheduling assignment in the member component carrier.

A UE performs the following steps upon decoding of the PDCCH on the member component carrier at first. The UE identifies the CCE aggregation level as 2 and the CCE index as 1 in accordance with the second column of Table 8. The UE further receives the relative index with value "00", indicating that a scheduling assignment in the reference component carrier is on aggregation level 1 and CCE index 1 (cf. first row in Table 1701 of FIG. 17). Based on the known CCE aggregation level and index in the reference component carrier, the UE can, again, determine the ACK/NACK resource index.

Thus, the UE is capable of determining a possibly missing scheduling assignment and also of determining the ACK/NACK resource index in case the reference component carrier is read at first and the PDCCH on member component carrier is missed as well as in case the member component carrier is read at first and the PDCCH on reference component carrier is missed.

In the case when there is no transmission in the reference component carrier and when there is a scheduling assignment in the member component carrier, eNB may still reserve a CCE index in the reference component carrier, which corresponds to the uplink ACK/NACK resource. This CCE index can be blocked from being assigned to any other UE to avoid ACK/NACK resource collision. In scenarios, in which there is transmission in the common search space region on the reference component carrier and in the UE-specific search space region in the member component carrier, it is still possible to link the CCE index of the reference component carrier to the ACK/NACK resource index in a similar way. It is also possible to reserve a code point for the no-transmission case within the reference component carrier, making the UE capable of distinguishing that there has been no transmission.

The present invention improves the reliability of the ACK/NACK reporting at the UE side due to a possibly perfect detection of missed assignments on all bundled component carriers. The UE has the scheduling assignment information on both reference and member component carriers. This further allows for a correct bundling of ACK/NACK report in all cases since the UE has knowledge on missed scheduling assignments by detecting at least one PDCCH of linked component carriers correctly. Thus, the bundling of ACK/NACK report from UE is mostly correct. Another advantage of the present invention is the possibility to reduce the ACK/NACK resources reserved for a UE since the ACK/NACK resource is always linked to the reference component carrier. In case if there is only a single reference component carrier, the UE requires only a single ACK/NACK resource. Moreover, the eNB is not required to perform blind detection on overbooked ACK/NACK resources.

Another advantage of the present invention is the relaxed scheduler restrictions due to CCE limitations. Different CCE locations can be used on all component carriers. Since UE is aware of missed assignments, also the DRX operation per component carrier is more robust. Both UE and eNB are aware of missing the scheduling assignments by the UE. In this way, the UE and the eNB keep synchronised. Since the scheduling assignment is known to the linked component carriers, the number of blind decoding of PDCCH is decreased. With RI, the UE may know exact CCE index assignment in the reference component carrier, which enables reducing the number of blind decodings of PDCCH in the reference component carrier. It is also possible to reduce the number of blind decoding of PDCCH in member component carrier with signalling of the allocation map for each component carrier and signalling, in addition the relative index for all or member only component carriers. Moreover, the UE can save power by not trying to search for PDCCH assignment in case there is no transmission in the component carrier. The UE has knowledge of the scheduling assignments in reference and member component carriers. In case there is no scheduling assignment in one of the linked component carrier, the UE could stop searching for PDCCH in order to save power.

In accordance with another embodiment of the present invention, both reference component carrier and a member component carrier (or a plurality of member component carriers) signals the allocation map.

The allocation map format for any embodiment of the present invention is not limited to a bitmap as described above with reference to FIG. 13. Another example allocation map for the case when the number of member component carrier is more than one is shown in FIG. 18. Accordingly, the allocation map of each component carrier signals a value represented by a predefined number of bits, the value indicating the scheduling assignments in at least one component carrier. The number of PDCCH bits required for the signalling of such allocation map depends on the number of linked component carriers for which the allocation map is signalled. If two component carriers are linked, a 1 single bit is necessary to signalize in each component carrier if the other component carrier includes a scheduling assignment. For three, four and five component carriers linked, 2, 3 and 4 bits for allocation map are necessary. FIG. 18 shows an example of such signalling for different scheduling assignment combinations for four linked component carriers. Three bits b0, b1 and b2 form the allocation map of each of the four component carriers. For different component carriers, the three bits have different meaning corresponding to different columns of the table (PDCCH 1 to 4). For instance, bits "011" of the allocation map in the component carrier 2 (PDCCH 2) indicate that scheduling assignment is included on the component carriers 2 and 4. The same bits "011" of the allocation map in the component carrier 4 (PDCCH 4) indicate that scheduling assignment is included on the component carriers 4 and 3.

Figure 19:
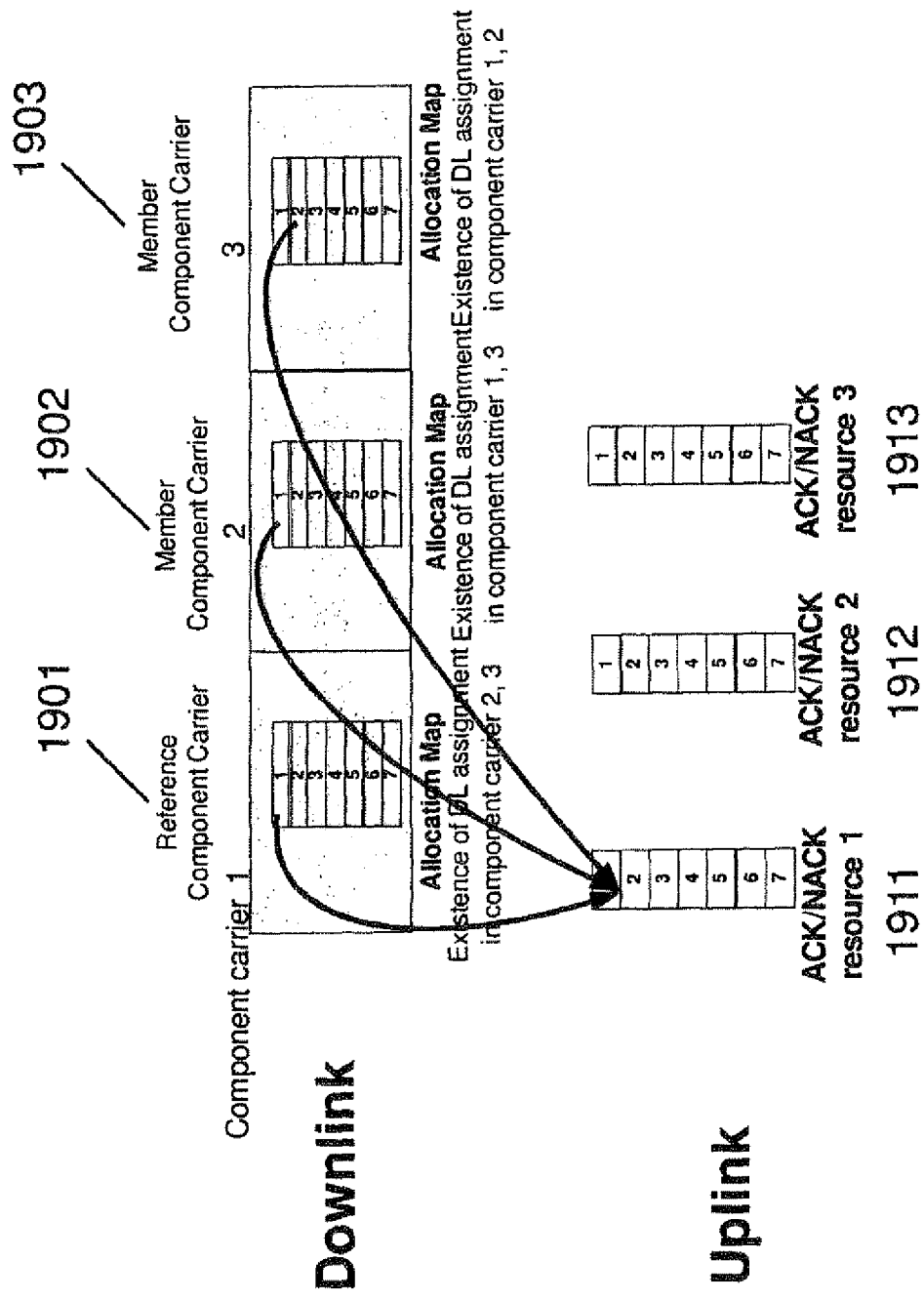
FIG. 19 is a schematic drawing illustrating an example of CCE index to ACK/NACK index mapping using the same CCE index for all linked component carriers.

The CCE index to ACK/NACK index mapping may be performed only for a reference component carrier. Since relative index is not signalled, the CCE index assigned on the reference component carrier should be known to the member component carrier. This may be achieved by assigning the same CCE index to the reference and to the member component carriers as shown in FIG. 19 for three component carriers 1901, 1902 and 1903 with the same CCE index 1 linked with the same ACK/NACK resource 1911. The ACK/NACK resources 1912 and 1913 do not need to be allocated.

Figure 20:
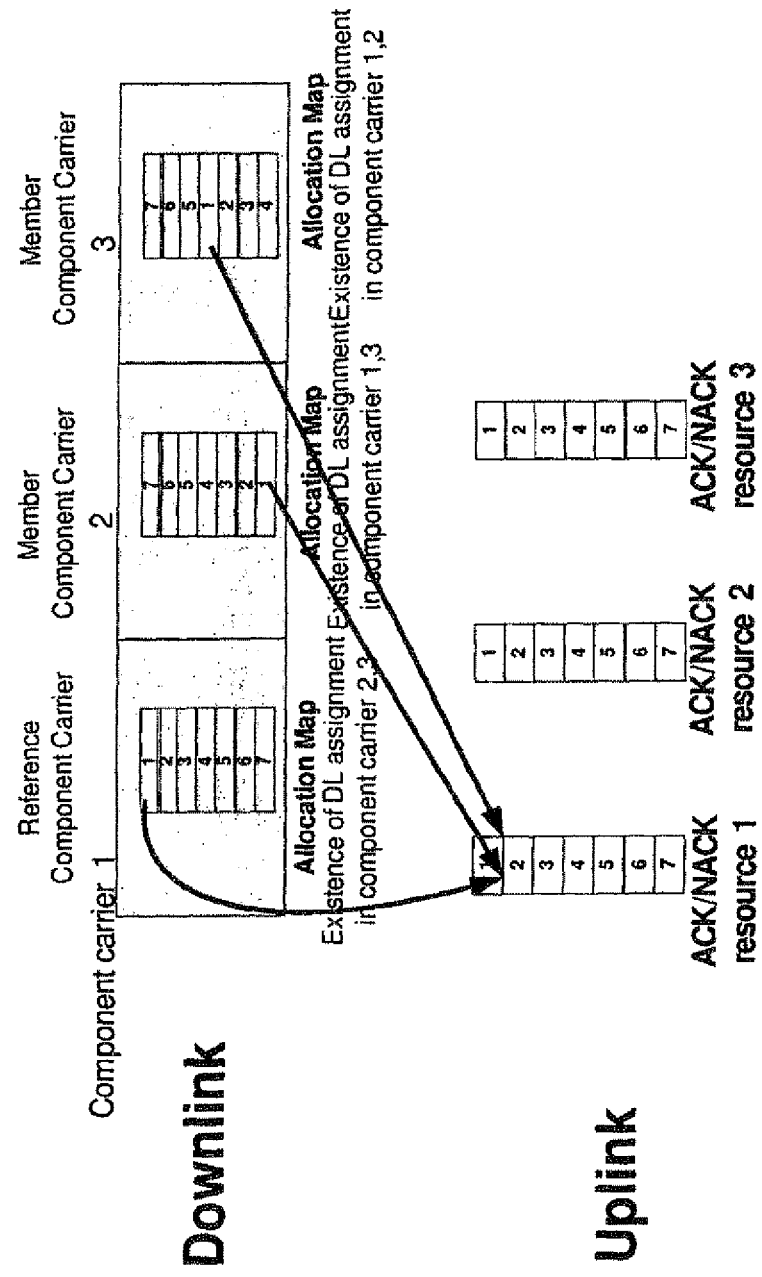
FIG. 20 is a schematic drawing illustrating another example of CCE index to ACK/NACK index mapping using different CCE index for the linked component carriers.
Figure 21:
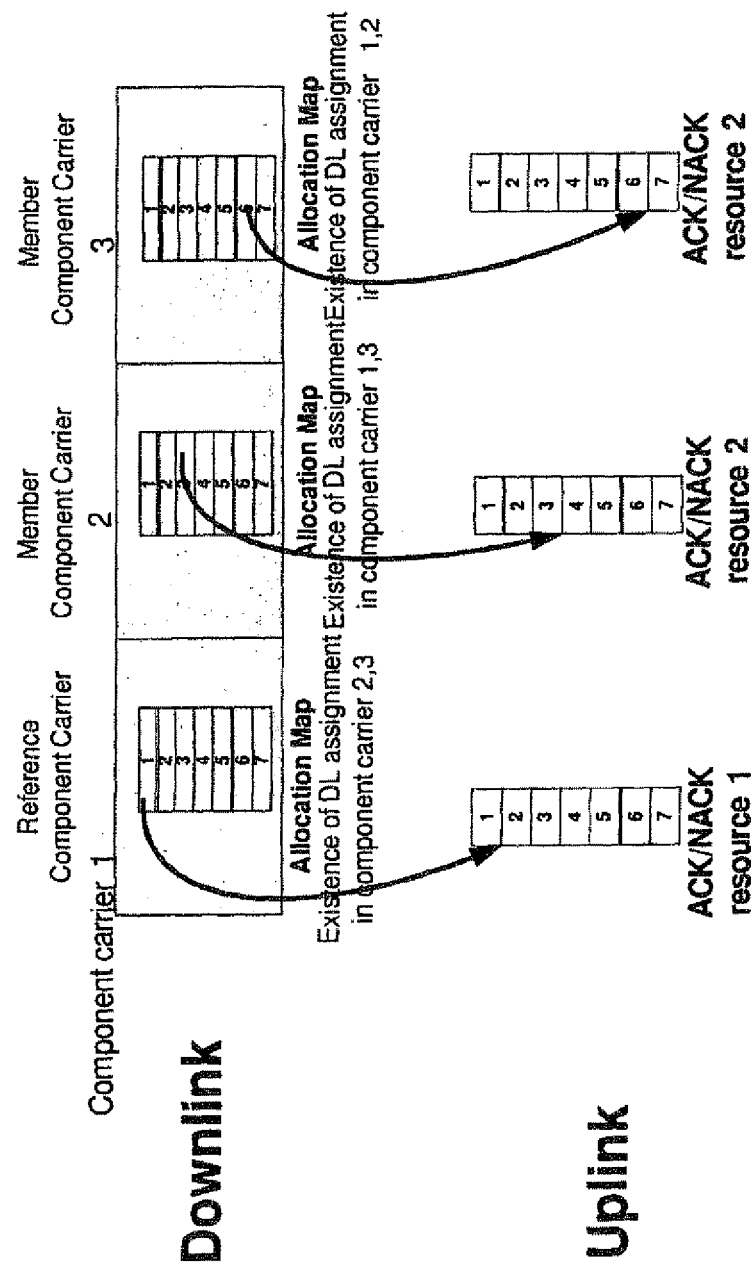
FIG. 21 is a schematic drawing illustrating another example of CCE index to ACK/NACK index mapping independent for different component carriers.

FIG. 20 illustrates an alternative of indexing the CCEs in the reference and member component carriers such that it is not necessary to assign same CCE location on both reference and member component carriers. It is even possible to assign the CCEs independently in both reference and member component carriers. However, a CCE index to ACK/NACK index mapping in such case is performed per component carrier. The reliability with respect to the detection of missed assignment remains the same as for the above-described solutions. However, additional ACK/NACK resources are required as illustrated in FIG. 21.

Figure 22:
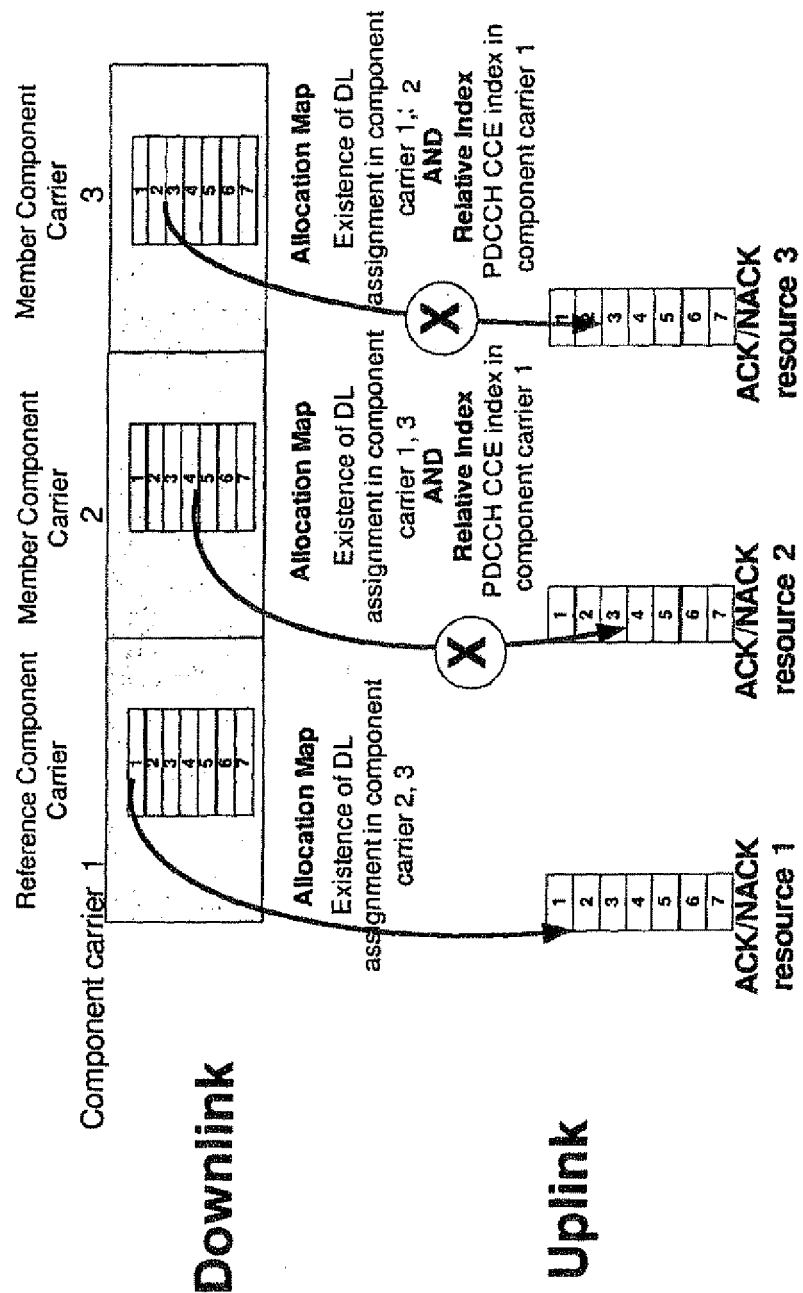
FIG. 22 is a schematic drawing illustrating an example of control signal receiving/transmitting wherein an allocation map for all component carriers and relative index for member component carriers is signaled.

In accordance with still another embodiment of the present invention, a reference component carrier signals an allocation map and a member component carrier signals an allocation map together with the relative index (RI) as illustrated in FIG. 22. In this case, it is possible to have a single ACK/NACK resource linked to the reference component carrier. The CCE index of the reference component carrier linked to the ACK/NACK resource index is known to the UE by detecting the PDCCH of a member component carrier in which the relative index is signalled. In this embodiment, the detection of missed assignments also among member component carriers is possible (in case of more than one member component carriers).

Figure 23:
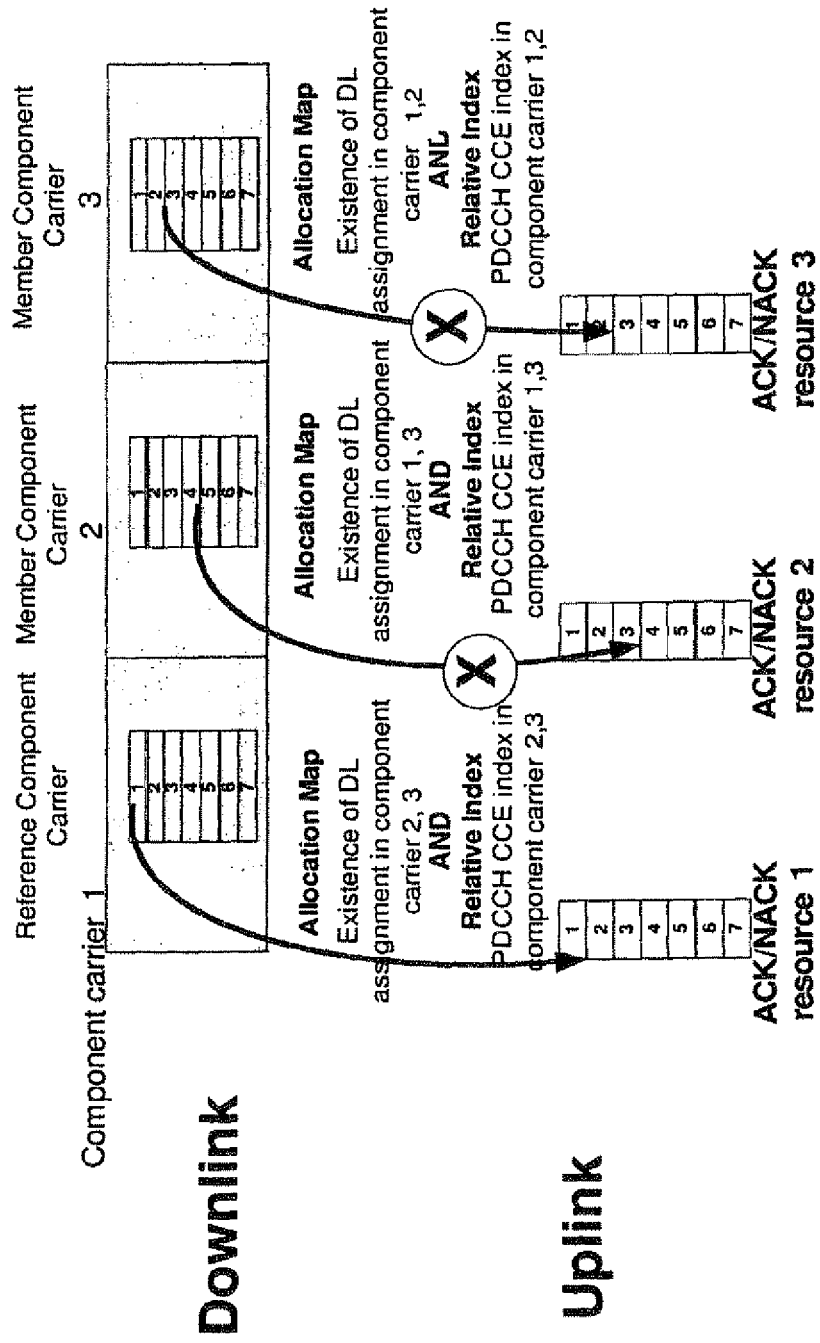
FIG. 23 is a schematic drawing illustrating an example of control signal receiving/transmitting wherein an allocation map and relative index are signaled for each component carriers.

In accordance with still another embodiment of the present invention, a reference component carrier as well as a member component carrier signals the allocation map together with the relative index (RI) as shown in FIG. 23. The Allocation Map in the member component carriers enables the UE to detect the missed assignments in the member component carriers. Moreover, relative index position signalling on both reference and member component carriers enables the UE to improve knowledge on the CCE index used for PDCCH assignment. In case if UE decodes at least one PDCCH, UE will have information about scheduling assignment in each component carrier from the allocation map field of PDCCH and about the CCE assignment in each component carrier from the RI field of PDCCH. With the information of RI on more than one component carrier, the number of blind decoding can be further reduced, allowing for power saving for the UE.

The present invention is also applicable for the detection of missed scheduling assignments for ACK/NACK transmission in PUCCH or multiplexing of ACK/NACK and data in PUSCH. In general, the present invention is not limited to sending the scheduling assignments in downlink and the acknowledgements in uplink.

Figure 24:
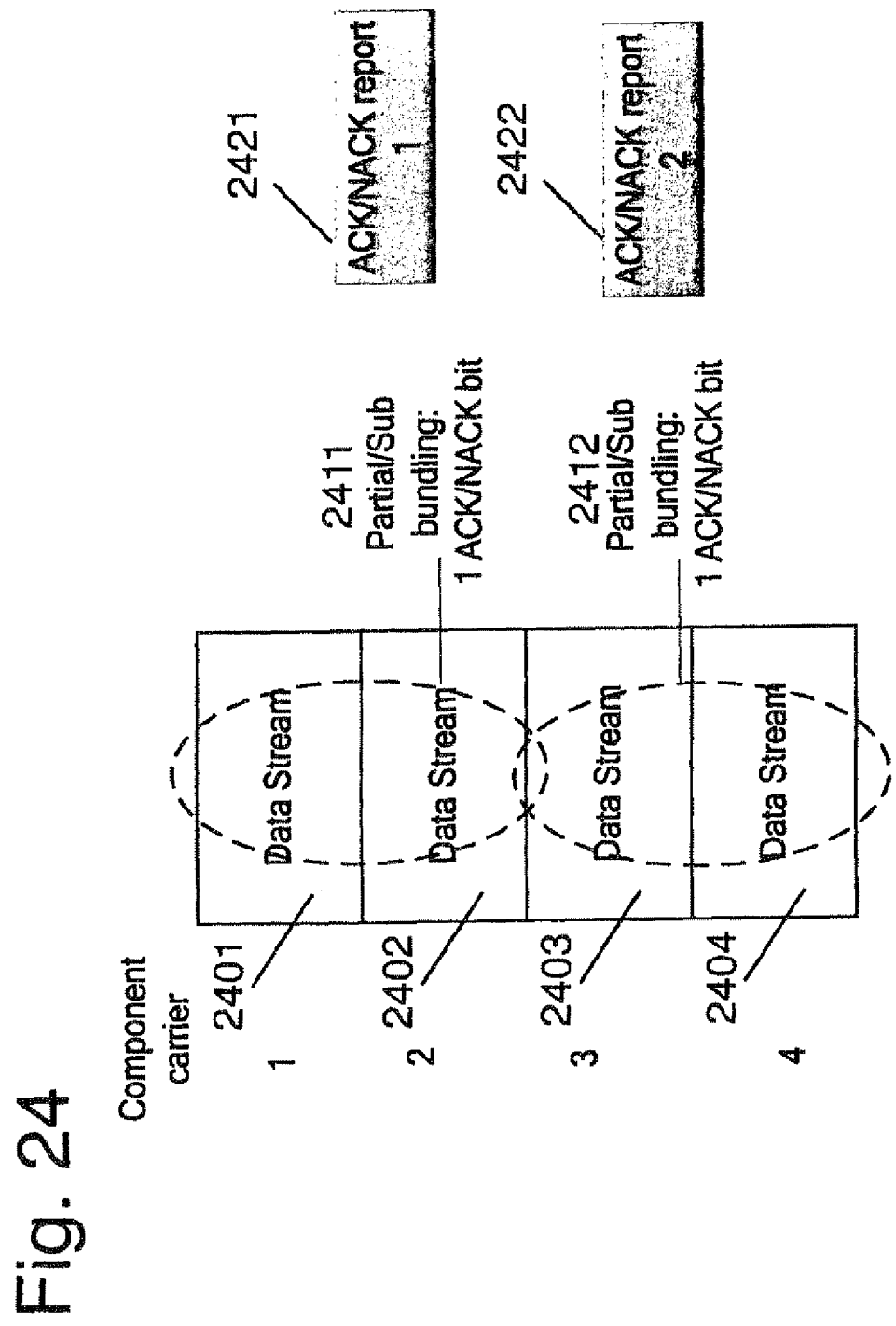
FIG. 24 is a schematic drawing illustrating partial bundling of the acknowledgement signal.

The ACK/NACK bundling may be full or partial. In full bundling, the linked component carriers configured for bundled ACK/NACK report are bundled and a single acknowledgement signal is transmitted. In partial bundling, there could be multiple bundles of a single acknowledgement signal for the linked component carriers as illustrated in FIG. 24. Four component carriers 2401, 2402, 2403 and 2404 are partially bundled: component carriers 2401 and 2402 are bundled in a bundling window 2411 and will be assigned a single ACK/NACK report 2421. Component carriers 2403 and 2404 are bundled in a bundling window 2412 and will be assigned a single ACK/NACK report 2422.

Figure 25:
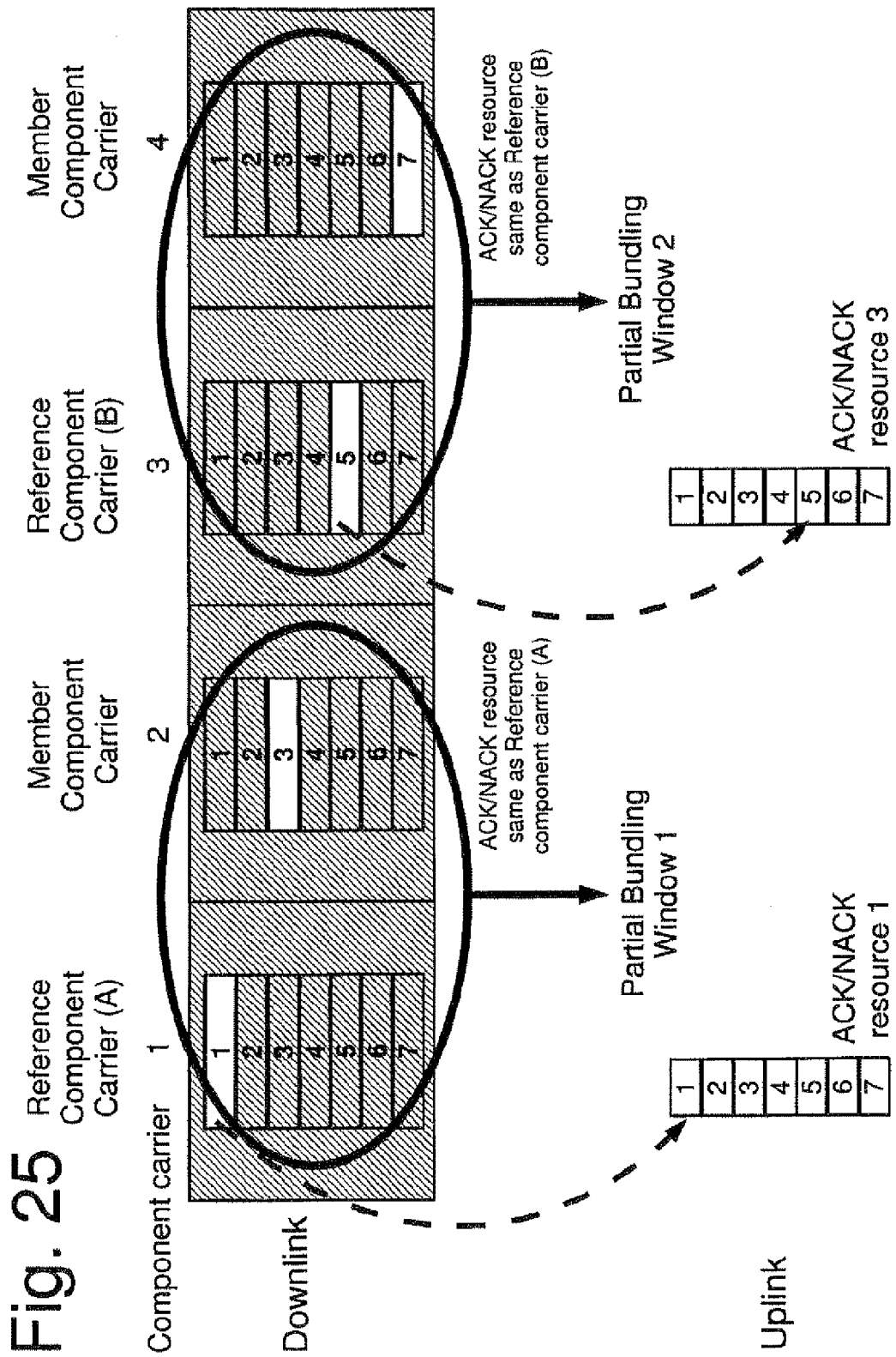
FIG. 25 is a schematic illustration of an example with single ACK/NACK resource for partially bundled component carriers with more reference component carriers.
Figure 26:
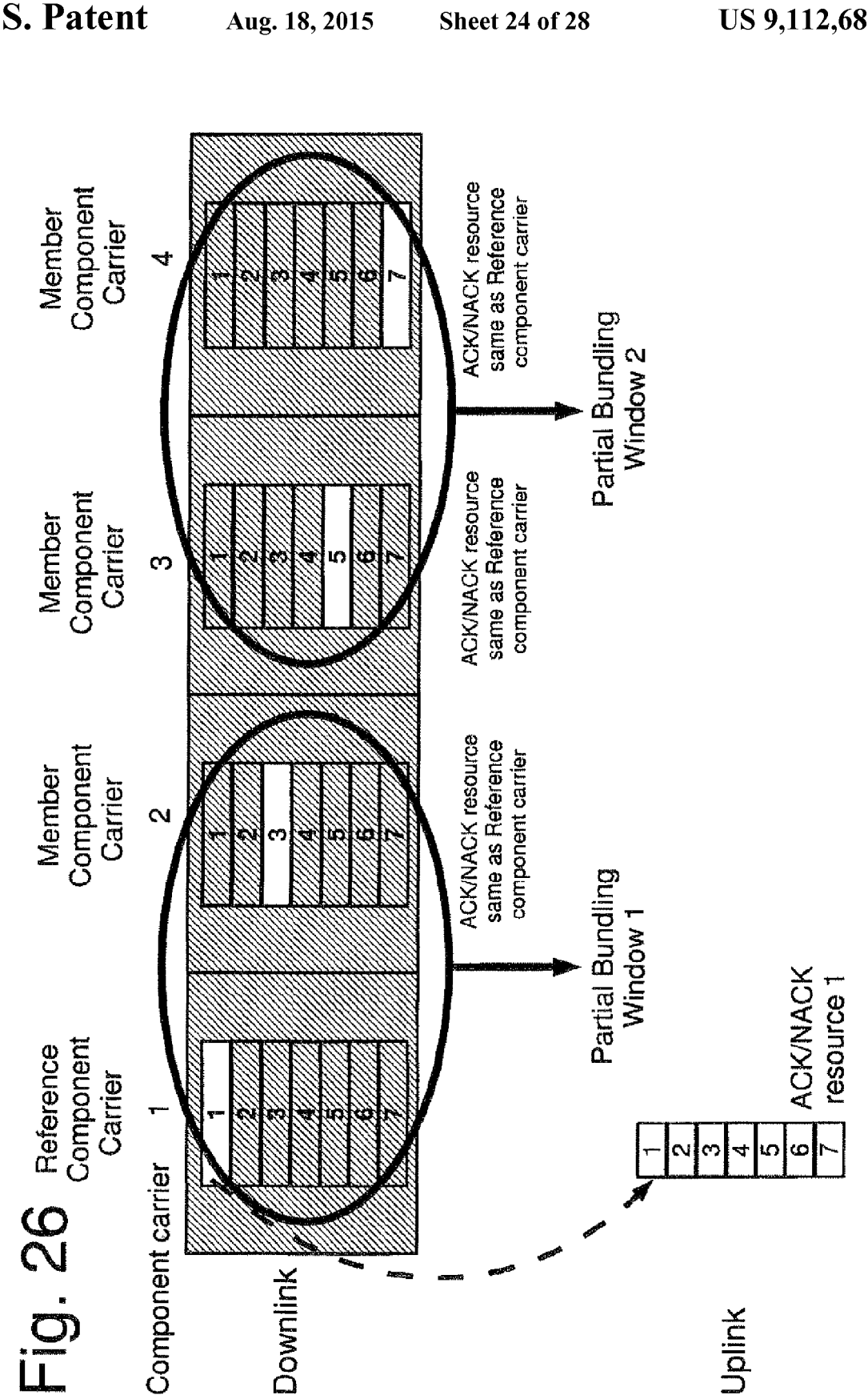
FIG. 26 is a schematic illustration of an example with single ACK/NACK resource for partially bundled component carriers with a single reference component carrier.

FIG. 25 illustrates that it is also possible to have a single ACK/NACK resource per partially bundled window. Partial bundling enable further reducing the retransmission probability compared to the full bundling case. The number of component carriers may vary for each partial/sub bundled window. Furthermore, in case of partial bundling, there may be more than one reference component carrier as shown in FIG. 25. Preferably, there is one reference component carrier per partial/sub bundling window. FIG. 26 illustrates an alternative, where only one reference component carrier is common for more than one partial/sub bundling window.

Figure 27:
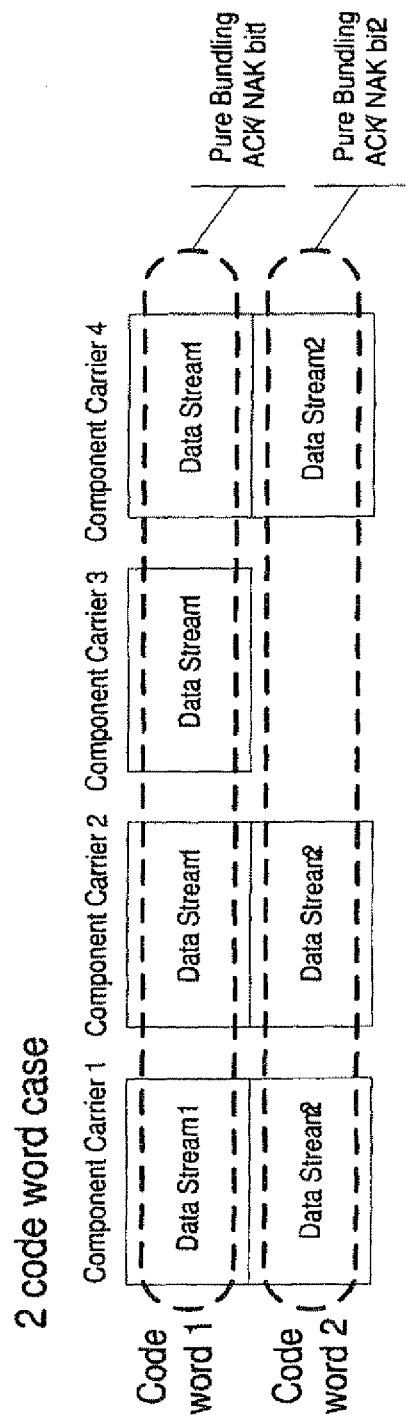
FIG. 27 is a schematic illustration of the present invention applied to more that one codewords in MIMO SDM, the bundling being performed per codeword.
Figure 28:
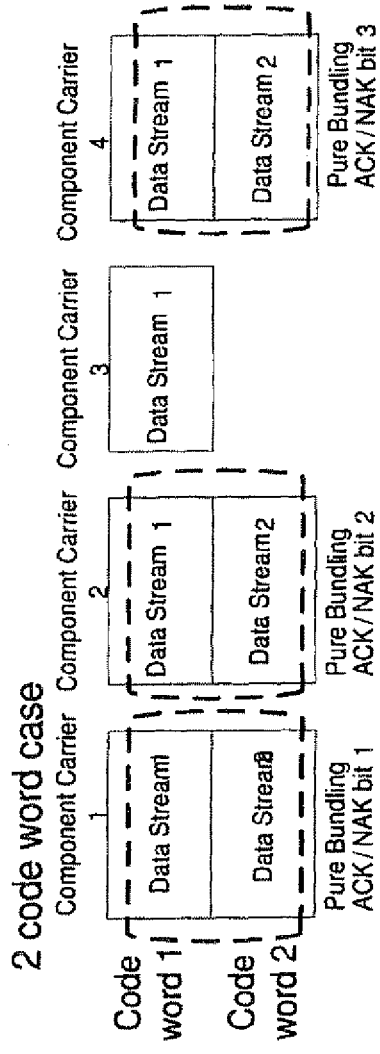
FIG. 28 is a schematic illustration of the present invention applied to more that one codewords in MIMO SDM, the bundling being performed per more codewords.

In accordance with still another embodiment of the present invention, for MIMO Spatial Division Multiplexing (SDM), the bundling could be performed per codeword across all component carriers as shown in FIG. 27. It is also possible to have bundling of ACK/NACKs per component carriers for multiple codewords as shown in FIG. 28. The present invention may also be applied to more than two codewords using both full bundling and partial bundling. The bundled ACK/NACK report can be transmitted as a single ACK/NACK report or ACK/NACK bits can be multiplexed and a collective ACK/NACK report can be transmitted.

The number of component carriers in the uplink and downlink might be same (symmetric) or different (asymmetric). For TDD mode with multiple component carriers (bandwidth aggregation), there are multiple component carriers for multiple downlink subframes within one radio frame. For instance, the component carrier may differ from subframe to subframe. A subframe may comprise a single component carrier. Various possibilities for ACK/NACK bundling may be applied in such a scenario.

Figure 29:
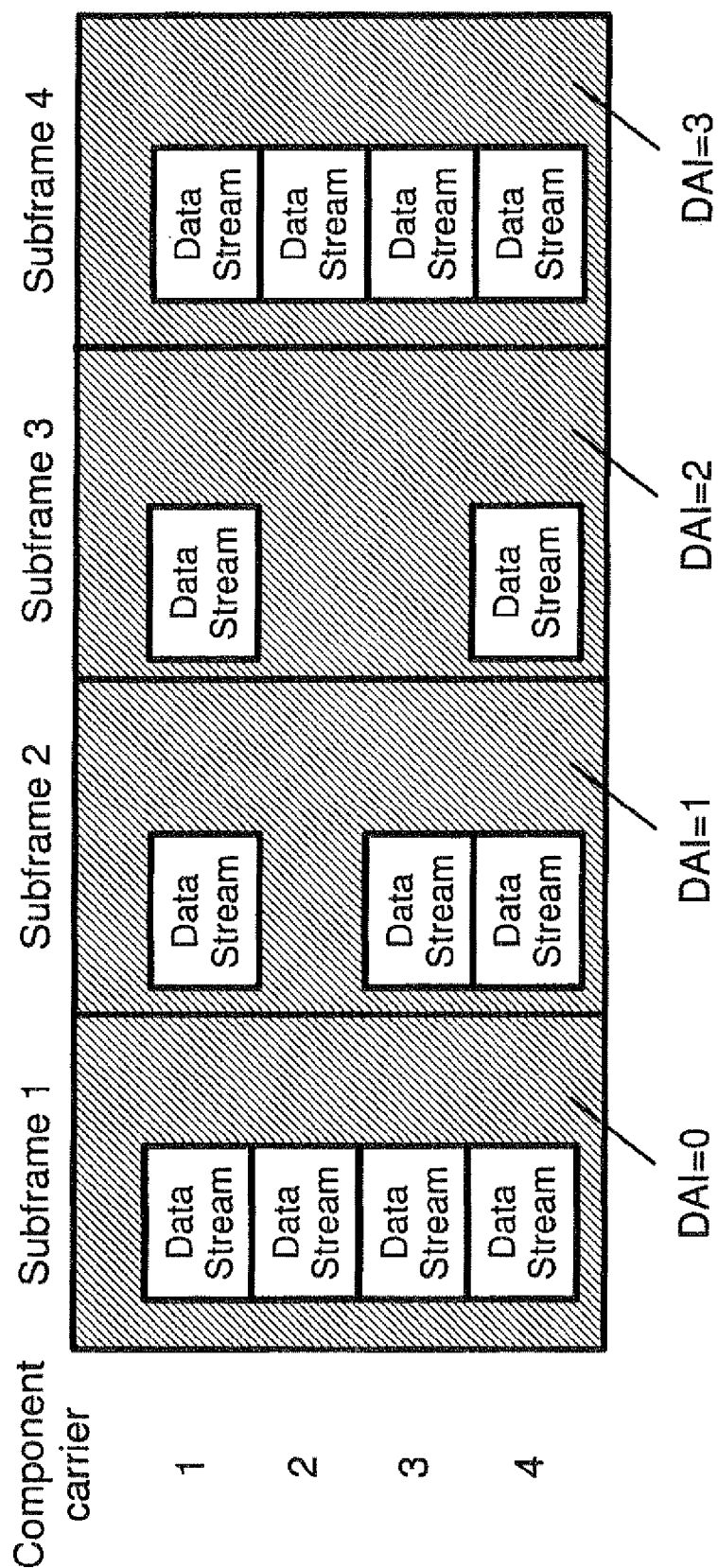
FIG. 29 is a schematic illustration of the application of the present invention for detecting missed scheduling assignments at the subframe level for TDD mode.

FIG. 29 shows applying LTE Rel'8 TDD concept for detecting missed scheduling assignments at the subframe level based on the DAI information in PDCCH of at least one of the component carriers in each downlink subframe. Directly applying the current invention enables detecting the missed assignments for the linked component carries within each subframe.

Figure 30:
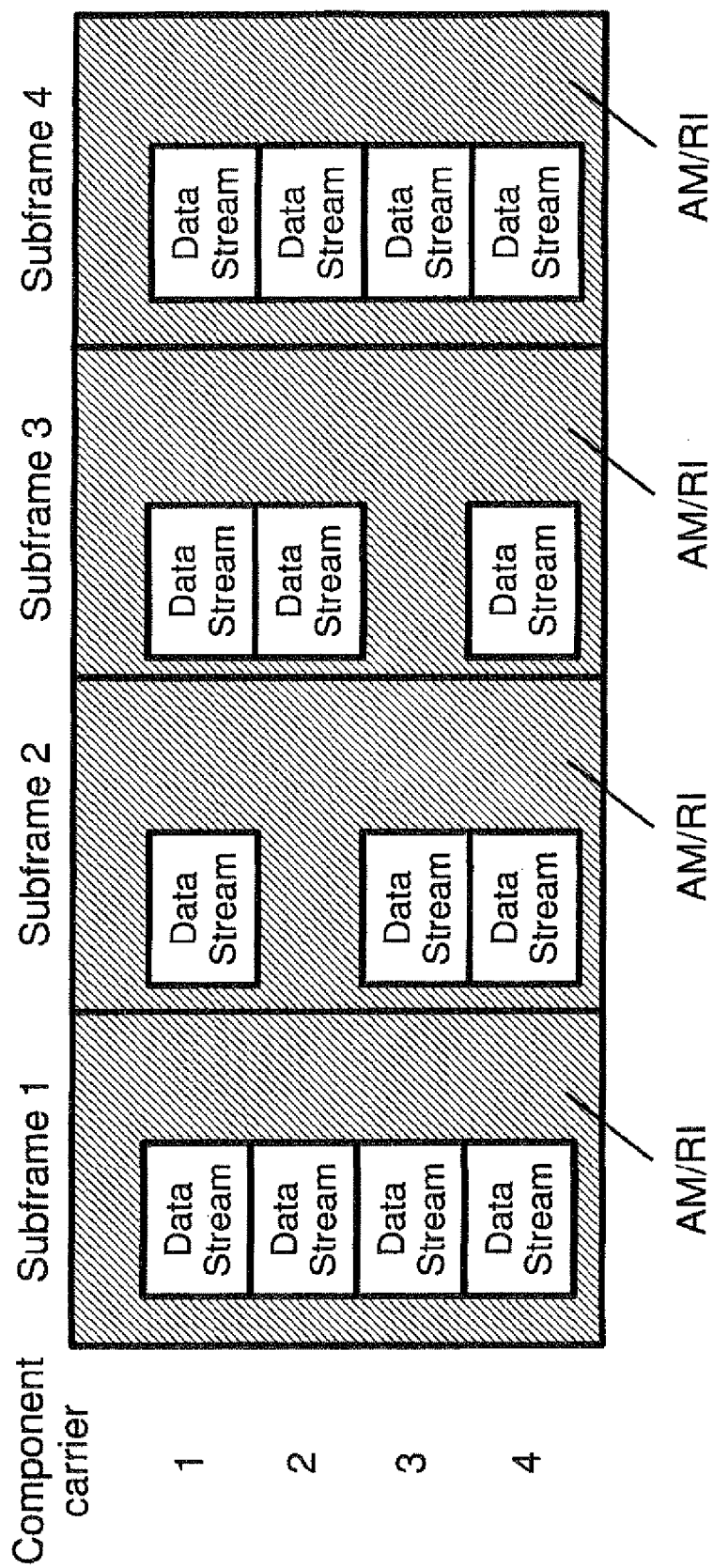
FIG. 30 is a schematic drawing illustrating application of the present invention for detecting of the missing downlink subframe assignments for TDD mode.
Figure 31:
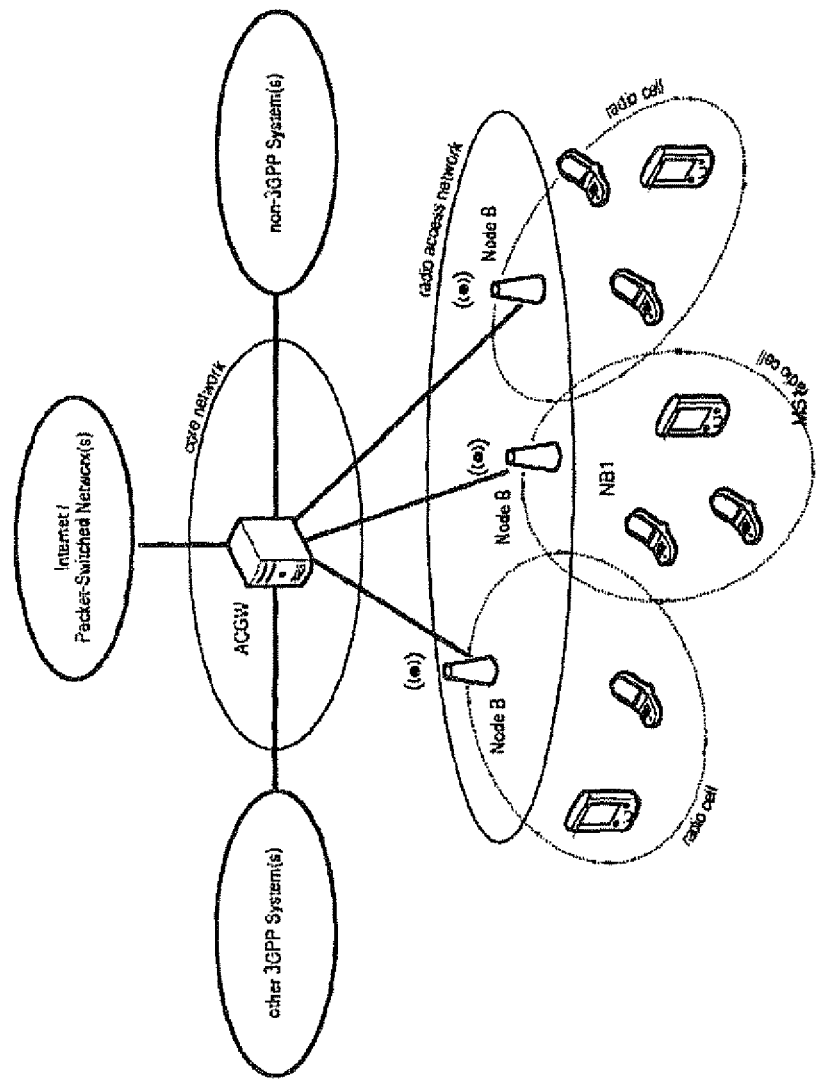
FIG. 31 is a schematic drawing illustrating 3GPP LTE architecture.

FIG. 30 illustrates applying the present invention to detect the missed downlink subframes with replacing, in the approach of the present invention, the component carriers by downlink subframes. The allocation map and/or relative index in one of the component carriers' PDCCH in each downlink subframe is shown in FIG. 30. The signalling of the allocation map and/or relative index enables the UE to detect the missed assignments of the downlink subframes within the bundling window. The scheduling might also be performed on a bundling window basis.

The description of LTE specific procedures is intended to better understand the LTE specific exemplary embodiments described herein and should not be understood as limiting the invention to the described specific implementations of processes and functions in the mobile communication network. Similarly, the use of LTE specific terminology is intended to facilitate the description of the key ideas and aspects of the invention but should not be understood as to limit the invention to LTE systems.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to a 3GPP-based communication system, in particular LTE, and the terminology mainly relates to the 3GPP terminology. However, the terminology and the description of the various embodiments with respect to 3GPP-based architectures is not intended to limit the principles and ideas of the inventions to such systems.

Also the detailed explanations of the resource mapping in the LTE are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described. Furthermore the concept of the invention may be also readily used in the LTE RAN (Radio Access Network) currently discussed by the 3GPP.

Summarizing, the present invention provides a method and an apparatus for transmitting and/or receiving of data signal and control signal in a communication system with multiple component carriers. In a first component carrier control signal with scheduling assignment, an allocation map is signaled, which specifies whether and/or which another (a second) component carrier(s) include a scheduling assignment. Based on the control signal in the first and the second component carrier it is evaluated if a scheduling assignment has been sent and received on the second component carrier.

The invention claimed is:

1. A method for transmitting a data signal and a control signal in a wireless communication system supporting aggregation of a plurality of component carriers, each component carrier comprising resources specified by at least transmission slot and subband frequency, the method comprising the step of:
  generating a scheduling assignment specifying for a first component carrier a resource for transmission of a data signal;
  determining an allocation map represented by a bitmap with each bit specifying whether, for a single respective carrier of the plurality of component carriers, and for which of the plurality of component carriers including a second component carrier, a scheduling assignment has been generated;

transmitting a control signal within the first component carrier, the control signal comprising the generated scheduling assignment for the first component carrier and the allocation map;

transmitting the data signal using the resource for transmission of the data signal, said resource for transmission of the data signal being specified by the scheduling assignment for the first component carrier; and receiving, within a resource for transmission of an acknowledgement signal linked with the resource for transmission of the data signal specified for the first component carrier, an acknowledgement signal related to the transmitted data signal, wherein the acknowledgement signal is common for data signals in a plurality of component carriers, wherein a control signal within the second component carrier comprises a relative index linked to the resource for transmission of the acknowledgement signal within the first component carrier.

2. The method according to claim 1 wherein each of the plurality of component carriers comprises at least one of the allocation map and the relative index.

3. The method according to claim 1 wherein the wireless communication system is an LTE-Advanced based system.

4. A method for receiving a data signal and a control signal in a wireless communication system supporting aggregation of a plurality of component carriers, each component carrier comprising resources specified by at least transmission slot and subband frequency, the method comprising the steps of receiving a control signal within a first component carrier and within a second component carrier;

extracting from the control signal within the first component carrier a scheduling assignment specifying for the first component carrier a resource for receiving a data signal;

extracting from the control signal within the first component carrier an allocation map represented by a bitmap with each bit specifying whether, for a single respective carrier of the plurality of component carriers, and for which of the plurality of component carriers including the second component carrier, a scheduling assignment has been generated;

evaluating based on the allocation map and on a control signal within the second component carrier whether a scheduling assignment for the second component carrier has been sent and received;

receiving the data signal using the resource for receiving of the data signal, said resource for receiving of the data signal being specified by the scheduling assignment for the first component carrier; and transmitting, within a resource for transmission of an acknowledgement signal linked with the resource for receiving the data signal specified for the first component carrier, an acknowledgement signal related to the received data signal, wherein the acknowledgement signal is common for data signals in a plurality of component carriers, wherein a control signal within the second component carrier comprises a relative index linked to the resource for transmission of the acknowledgement signal within the first component carrier.

5. The method according to claim 4 wherein each of the plurality of component carriers comprises at least one of the allocation map and the relative index.

6. The method according to claim 4 wherein the wireless communication system is an LTE-Advanced based system.

7. An apparatus for transmitting a data signal and a control signal in a wireless communication system supporting aggregation of a plurality of component carriers, each component carrier comprising resources specified by at least transmission slot and subband frequency, the apparatus comprising:

an allocation unit for generating a scheduling assignment specifying for a first component carrier a resource for transmission of a data signal;

a map determining unit for determining an allocation map represented by a bitmap with each bit specifying whether, for a single respective carrier of the plurality of component carriers, and for which of the plurality of component carriers including a second component carrier, a scheduling assignment has been generated;

a control signal transmitting unit for transmitting a control signal within the first component carrier, the control signal comprising the generated scheduling assignment for the first component carrier and the allocation map;

a data signal transmitting unit for transmitting the data signal using the resource for transmission of the data signal, said resource for transmission of the data signal being specified by the scheduling assignment for the first component carrier; and a feedback receiving unit for receiving, within a resource for receiving of an acknowledgement signal linked with the resource for transmission of the data signal specified for the first component carrier, an acknowledgement signal based on the transmitted data signal, wherein the acknowledgement signal is common for data signals in a plurality of component carriers, wherein a control signal within the second component carrier comprises a relative index linked to a resource for transmission of the acknowledgement signal within the first component carrier.

8. The apparatus according to claim 7 wherein each of the plurality of component carriers comprises at least one of the allocation map and the relative index.

9. The apparatus according to claim 7 wherein the wireless communication system is an LTE-Advanced based system.

10. An apparatus for receiving a data signal and a control signal in a wireless communication system supporting aggregation of a plurality of component carriers, each component carrier comprising resources specified by at least transmission slot and subband frequency, the apparatus comprising:

a control signal receiving unit for receiving a control signal within a first component carrier and within a second component carrier;

an extraction unit for extracting from the control signal within the first component carrier a scheduling assignment specifying for the first component carrier a resource for receiving a data signal, and for extracting from the control signal within the first component carrier an allocation map represented by a bitmap with each bit specifying whether, for a single respective carrier of the plurality of component carriers, and for which of the plurality of component carriers including the second component carrier, a scheduling assignment has been generated;

an evaluation unit for evaluating based on the allocation map and on a control signal within the second component carrier whether a scheduling assignment for the second component carrier has been sent and received;

a data signal receiving unit for receiving the data signal using the resource for receiving of the data signal, said resource for receiving of the data signal being specified by the scheduling assignment for the first component carrier; and a feedback transmitting unit, within a resource for transmission of an acknowledgement signal linked with the resource for receiving the data signal specified for the first component carrier, an acknowledgement signal based on the received data signal, wherein the acknowledgement signal is common for data signals in a plurality of component carriers and wherein a control signal within the second component carrier comprises a relative index linked to the resource for transmission of the acknowledgement signal within the first component carrier.

11. The apparatus according to claim 10 wherein each of the plurality of component carriers comprises at least one of the allocation map and the relative index.

12. The apparatus according to claim 10 wherein the wireless communication system is an LTE-Advanced based system.

* * * * *

UNITED STATES PATENT AND TRADEMARK OFFICE
CERTIFICATE OF CORRECTION

PATENT NO. : 9,112,686 B2  
APPLICATION NO. : 13/140333  
DATED : August 18, 2015  
INVENTOR(S) : Priya Hariharan et al.

Page 1 of 1

It is certified that error appears in the above-identified patent and that said Letters Patent is hereby corrected as shown below:

Title Page, below Item (65) insert

-- (30) Foreign Application Data

December 19, 2008     (EP)......08022138.5 --.

Signed and Sealed this
Fifth Day of July, 2016

Michelle K. Lee
*Director of the United States Patent and Trademark Office*